United States Patent
Guo et al.

(10) Patent No.: US 10,880,888 B2
(45) Date of Patent: Dec. 29, 2020

(54) METHODS, APPARATUS AND SYSTEMS FOR DETERMINING A TRANSPORT BLOCK SIZE IN A WIRELESS COMMUNICATION

(71) Applicant: ZTE CORPORATION, Guangdong (CN)

(72) Inventors: Qiujin Guo, Guangdong (CN); Jun Xu, Guangdong (CN); Jin Xu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/539,242

(22) Filed: Aug. 13, 2019

(65) Prior Publication Data
US 2020/0037317 A1   Jan. 30, 2020

Related U.S. Application Data

(63) Continuation of application No. PCT/CN2017/111730, filed on Nov. 17, 2017.

(51) Int. Cl.
*H04W 72/04* (2009.01)

(52) U.S. Cl.
CPC ..... *H04W 72/0446* (2013.01); *H04W 72/042* (2013.01)

(58) Field of Classification Search
CPC ... H04L 1/0007; H04L 1/0003; H04L 1/0009; H04L 5/0092; H04L 5/0044; H04L 69/24; H04L 72/0446; H04L 72/042; H04L 27/36; H04L 27/26
See application file for complete search history.

(56) References Cited

U.S. PATENT DOCUMENTS

| | | |
|---|---|---|
| 2015/0271802 A1 | 9/2015 | Kang et al. |
| 2017/0070378 A1* | 3/2017 | Pelletier ............... H04L 1/0039 |
| 2017/0105200 A1* | 4/2017 | Larsson ............. H04W 74/006 |

(Continued)

OTHER PUBLICATIONS

Nokia, Nokia Shanghai Bell, "Transport block size determination and the support of slot aggregation in NR", 3GPP TSG RAN WG1#90, R1-1714009, Aug. 21-25, 2017, Prague, Czech Republic, 3 pages.

(Continued)

*Primary Examiner* — Brian D Nguyen
(74) *Attorney, Agent, or Firm* — Duane Morris LLP

(57) ABSTRACT

Methods, apparatus and systems for determining a transport block size in a wireless communication are disclosed. In one embodiment, a method performed by a wireless communication device is disclosed. The method comprises: receiving control information from a wireless communication node, wherein the control information includes a plurality of transmission parameters related to transport blocks to be transmitted between the wireless communication device and the wireless communication node; calculating an intermediate transport block size (TBS) for the transport blocks based on the plurality of transmission parameters; modifying the intermediate TBS to generate a modified TBS in response to an event that the intermediate TBS is smaller than a threshold; and determining a final TBS for the transport blocks based on a TBS that is closest to the modified TBS, among TBSs that are in a quantized set and not smaller than the modified TBS.

13 Claims, 20 Drawing Sheets

(56) References Cited

U.S. PATENT DOCUMENTS

| | | | |
|---|---|---|---|
| 2017/0135098 A1 | 5/2017 | Kang et al. | |
| 2017/0164384 A1* | 6/2017 | Wang | H04L 5/001 |
| 2017/0181123 A1* | 6/2017 | Schliwa-Bertling | H04W 4/70 |
| 2018/0205431 A1* | 7/2018 | Nammi | H04L 1/1812 |
| 2018/0241500 A1* | 8/2018 | Takeda | H04L 5/0053 |
| 2019/0222455 A1* | 7/2019 | Sahin | H04L 27/2636 |

OTHER PUBLICATIONS

Ericsson, "Techniques for reliability", 3GPP TSG-RAN WG1 Meeting #90bis, R1-1717453, Oct. 9-13, 2017, Prague,Czech Republic, 5 pages.

\* cited by examiner

METHODS, APPARATUS AND SYSTEMS FOR DETERMINING A TRANSPORT BLOCK SIZE IN A WIRELESS COMMUNICATION

CROSS-REFERENCE TO RELATED APPLICATION

The present application claims priority to PCT international application PCT/CN2017/111730, entitled "METHODS, APPARATUS AND SYSTEMS FOR DETERMINING A TRANSPORT BLOCK SIZE IN A WIRELESS COMMUNICATION," filed on Nov. 17, 2017, which is expressly incorporated by reference herein in its entirety.

TECHNICAL FIELD

The disclosure relates generally to wireless communications and, more particularly, to methods, apparatus and systems for determining a transport block size in a wireless communication.

BACKGROUND

Wireless networking systems have become a prevalent means by which a majority of people worldwide has come to communicate. A typical wireless communication network (e.g., employing frequency, time, and/or code division techniques) includes one or more base stations (typically known as a "BS") that each provides a geographical radio coverage, and one or more wireless user equipment devices (typically know as a "UE") that can transmit and receive data within the radio coverage.

In a wireless communication system, e.g. the fifth-generation (5G) new radio (NR) network, a transport block (TB) is usually encoded and then sent. The UE obtains the modulation order, code rate and the number of layers from the downlink control information (DCI) and can calculate the number of resource elements from the allocated time and frequency domain ranges in the DCI. The UE can obtain an intermediate transport block size (TBS) based on these transmission parameters and determine the actual transmitted TBS according to a requirement of channel coding. Coding gains are different for different transport block sizes. Generally, a smaller transport block can obtain a coding gain smaller than that obtained by a larger transport block. But when the size of the transport block exceeds a certain value, the increase of coding gain is not obvious.

In an existing system, the transport block size (TBS) is calculated through a formula, wherein when the number of physical resource blocks (PRBs) is smaller, and when the level of modulation and coding scheme (MCS) is lower, the TBS is smaller and the performance of the resulting small transport block is poor. That is, to achieve the same target block error rate (BLER), a signal-to-noise ratio (SNR) required for a smaller transport block is higher than an SNR required for a large transport block. Therefore, when the calculated TBS is small, once the TBS slightly deviates from the actual TBS that can be transmitted, the SNR required to reach the same target BLER is greatly changed, which causes an unstable link performance.

In addition, the TBS calculated under different modulation orders and the SNR required to achieve the same target BLER follow some rules in an MCS table. When the number of PRBs is constant and the modulation order is constant, the value of SNR increases with the increase of spectrum efficiency (SE) or code rate (CR). In addition, the SNR change, referred to as $\Delta$SNR, of adjacent MCSs is balanced with the SE change, referred to as $\Delta$SE, of the adjacent MCSs. But in an actual MCS table, in order to ensure the same spectrum efficiency of adjacent MCSs of different modulation orders, it may result in a non-uniform distribution of $\Delta$SE values of adjacent MCSs of the same modulation order, which leads to a non-uniform $\Delta$SNR value of at the modulation order hopping, and again impacting the stability of the link.

Further, for any number of PRBs and any MCS modulation order, after the TBS is calculated by using an existing formula, if any one of the parameters in the formula changes, the calculated TBS will change. Because the two calculated TBSs during an initial transmission and a retransmission may be different, the transmission cannot be continued.

Thus, existing systems and methods for determining a transport block size in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication device is disclosed. The method comprises: receiving control information from a wireless communication node, wherein the control information includes a plurality of transmission parameters related to transport blocks to be transmitted between the wireless communication device and the wireless communication node; calculating an intermediate transport block size (TBS) for the transport blocks based on the plurality of transmission parameters; modifying the intermediate TBS to generate a modified TBS in response to an event that the intermediate TBS is smaller than a threshold; and determining a final TBS for the transport blocks based on a TBS that is closest to the modified TBS, among TBSs that are in a quantized set and not smaller than the modified TBS.

In a further embodiment, a method performed by a wireless communication node is disclosed. The method comprises: generating a plurality of transmission parameters related to transport blocks; transmitting control information that comprises the plurality of transmission parameters; calculating an intermediate transport block size (TBS) for the transport blocks based on the plurality of transmission parameters; modifying the intermediate TBS to generate a modified TBS in response to an event that the intermediate TBS is smaller than a threshold; determining a final TBS for the transport blocks based on a TBS that is closest to the modified TBS, among TBSs that are in a quantized set and not smaller than the modified TBS; and communicating with a wireless communication device using the transport blocks based on the final TBS.

In a different embodiment, a wireless communication device configured to carry out a disclosed method in some embodiment is disclosed.

In yet another embodiment, a wireless communication node configured to carry out a disclosed method in some embodiment is disclosed.

In still another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1A:
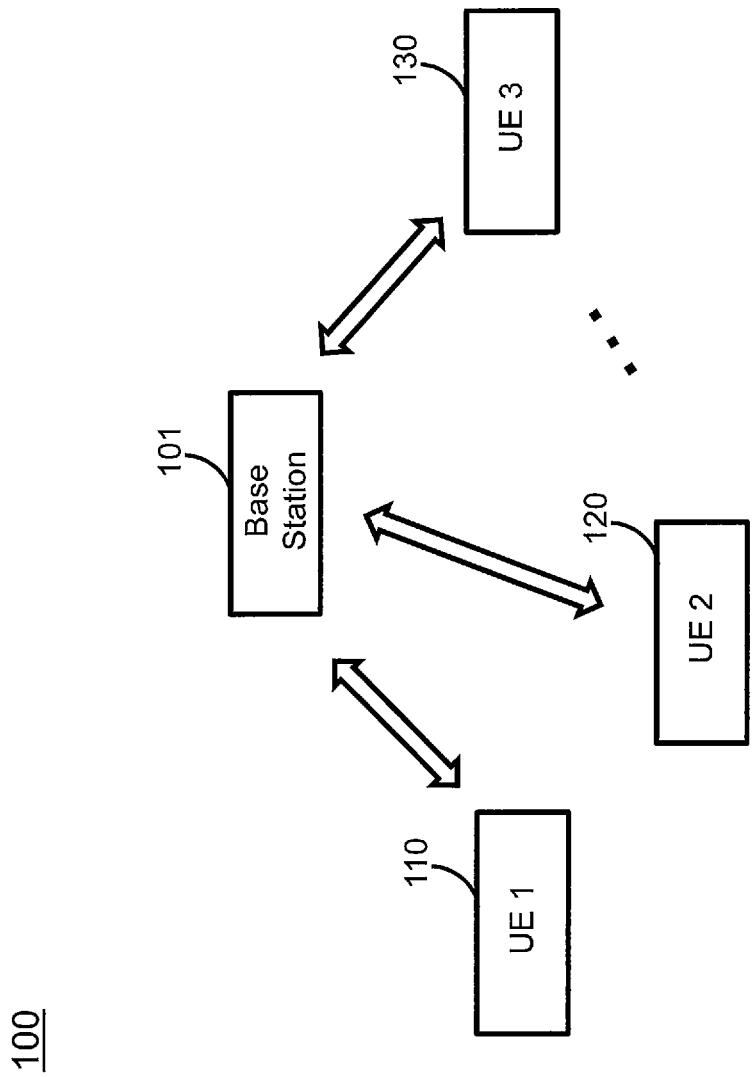
FIG. 1A illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

In a wireless communication system, e.g. the fifth-generation (5G) new radio (NR) network, a transport block (TB) is usually encoded and then sent. Coding gains are different for different transport block sizes. Generally, a smaller transport block can obtain a coding gain smaller than that obtained by a larger transport block. The coding gain of a transport block having a length of 100 bits may be nearly 1 dB different from that of a transport block having a length of about 5000 bits. But when the size of the transport block exceeds a certain value (for example, 5000 bits), the increase of coding gain is not obvious.

In an existing system, the transport block size (TBS) is calculated through a formula, wherein the TBS is smaller when the number of physical resource blocks (PRBs) is smaller, and when the level of modulation and coding scheme (MCS) is lower. The TBS is larger, when the number of PRBs is larger and/or when the MCS level is higher. Thus, when the number of PRBs is smaller, and when the MCS level is lower, the performance of the resulting small transport block is poor. That is, to achieve the same target block error rate (BLER), a signal-to-noise ratio (SNR) required for a smaller transport block is higher than an SNR required for a large transport block. Therefore, when the calculated TBS is small, once the TBS slightly deviates from the actual TBS that can be transmitted, the SNR required to reach the same target BLER is greatly changed, which is not conducive to obtaining a stable link performance. In an MCS table, the TBS calculated under different modulation orders and the SNR required to achieve the same target BLER follow some rules or trends. When the number of PRBs is constant and the modulation order is constant, the value of SNR increases with the increase of spectrum efficiency (SE) or code rate (CR). In addition, the SNR change, referred to as ΔSNR, of adjacent MCSs is balanced with the SE change, referred to as ΔSE, of the adjacent MCSs. That is, if the difference between the values of ΔSE of adjacent MCSs of the same modulation order is not significant (for example, the difference between ΔSEs does not exceed 0.05), the ΔSNR value of the adjacent MCSs is relatively uniform, and the corresponding link stability is also better. But in an actual MCS table, in order to ensure the same spectrum efficiency of adjacent MCSs of different modulation orders, it may result in a non-uniform distribution of ΔSE values of adjacent MCSs of the same modulation order, which leads to a non-uniform ΔSNR value of at the modulation order hopping (where the modulation order changes from an MCS index to an adjacent MCS index in the MCS table), affecting the stability of the link.

Below is an exemplary MCS table with spectral efficiency analysis:

| MCS Table | | | | |
|---|---|---|---|---|
| MCS Index | Modulation Order | TBS Index | SE | ΔSE |
| 0 | 2 | 0 | 0.2344 | NaN |
| 1 | 2 | 1 | 0.3057 | 0.0713 |
| 2 | 2 | 2 | 0.377 | 0.0713 |
| 3 | 2 | 3 | 0.4893 | 0.1123 |
| 4 | 2 | 4 | 0.6016 | 0.1123 |
| 5 | 2 | 5 | 0.7393 | 0.1377 |
| 6 | 2 | 6 | 0.877 | 0.1377 |
| 7 | 2 | 7 | 1.0264 | 0.1494 |
| 8 | 2 | 8 | 1.1758 | 0.1494 |
| 9 | 2 | 9 | 1.3262 | 0.1504 |
| 10 | 4 | 9 | 1.3262 | 0 |
| 11 | 4 | 10 | 1.4766 | 0.1504 |
| 12 | 4 | 11 | 1.69535 | 0.21875 |
| 13 | 4 | 12 | 1.9141 | 0.21875 |
| 14 | 4 | 13 | 2.1602 | 0.2461 |
| 15 | 4 | 14 | 2.4063 | 0.2461 |
| 16 | 4 | 15 | 2.5684 | 0.1621 |
| 17 | 6 | 15 | 2.5684 | 0 |
| 18 | 6 | 16 | 2.7305 | 0.1621 |
| 19 | 6 | 17 | 3.0264 | 0.2959 |
| 20 | 6 | 18 | 3.3223 | 0.2959 |
| 21 | 6 | 19 | 3.6123 | 0.29 |
| 22 | 6 | 20 | 3.9023 | 0.29 |
| 23 | 6 | 21 | 4.21285 | 0.31055 |
| 24 | 6 | 22 | 4.5234 | 0.31055 |
| 25 | 6 | 23 | 4.8193 | 0.2959 |
| 26 | 6 | 24 | 5.1152 | 0.2959 |
| 27 | 6 | 25 | 5.33495 | 0.21975 |
| 28 | 6 | 26 | 5.5547 | 0.21975 |

In response to this problem, the present disclosure provides a method to determine the size of the transport block. This method modifies the existing TBS calculation by introducing a correction factor to achieve the purpose of enhancing link stability.

Further, for any number of PRBs and any MCS modulation order, after the TBS is calculated by using the formula, if any one of the parameters in the formula changes, the calculated TBS will change. For example, the parameters allocated during the initial transmission are: $Q_m=2$, $R=308/1024$, the number of PRB is 2, the number of REs per PRB is 132, and the TBS is 120. Then the parameters allocated for retransmission are: $Q_m=2$, $R=379/1024$, the number of PRB is 2, the number of REs per PRB is 132, and the TBS is 176. Because the two calculated TBSs are different, the transmission cannot be continued.

In response to this problem, in consideration that the transport block size is the same during initial transmission and retransmission, the present disclosure provides a method to quantize the TBS to obtain a TBS set or TBS table. The UE can select, in the TBS table, a TBS that is closest to the calculated TBS in terms of rounding, rounding up, or rounding down the calculated TBS, to be a TBS used for transmission. As the quantization step size increases with the increase of TBS, the disclosed method can avoid complicated online calculation, ensure that the TBS granularity for transmission is good, and ensure that the TBS is the same in initial transmission and retransmission.

The methods disclosed in the present teaching can be implemented in a wireless communication network, where a BS and a UE can communicate with each other via a communication link, e.g., via a downlink radio frame from the BS to the UE or via an uplink radio frame from the UE to the BS. In various embodiments, a BS in the present disclosure can include, or be implemented as, a next Generation Node B (gNB), an E-UTRAN Node B (eNB), a Transmission/Reception Point (TRP), an Access Point (AP), etc.; while a UE in the present disclosure can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

FIG. 1A illustrates an exemplary communication network 100 in which techniques disclosed herein may be implemented, in accordance with an embodiment of the present disclosure. As shown in FIG. 1A, the exemplary communication network 100 includes a base station (BS) 101 and a plurality of UEs, UE1 110, UE2 120 . . . UE3 130, where the BS 101 can communicate with the UEs according to some wireless protocols. For example, before a downlink transmission, the BS 101 transmits downlink control information (DCI) to a UE, e.g. UE1 110, to schedule a transport block (TB) to be transmitted from the BS 101 to the UE1 110. The DCI may include a plurality of transmission parameters related to the transport blocks to be transmitted. Based on the plurality of transmission parameters, the UE may determine a transport block size (TBS) for transmission of the transport blocks. According to various embodiments, the TBS determination may be performed by the BS and/or the UE, and may be applied to downlink and/or uplink TB transmissions.

Below is a method for calculating TBS by using an existing formula for TBS determination. The method of calculation is to calculate $N_{RE} \times v \times Q_m \times R$ to achieve an intermediate value TBS_temp of the transport block bit size. The meanings of these parameters are shown as follows: $v$ is the number of layers of transportation; $Q_m$ is the modulation order, which can be obtained from the MCS index; $R$ is the code rate, which can be obtained according to the index of MCS; $N_{RE}$ is the number of resource elements (REs) whose value is $Y \times N^{XL}_{PRB}$, where $N^{XL}_{PRB}$ is the number of PRBs allocated, Y is the quantized value of X that is the number of REs per PRB, $X=12 \times N^{XL}_{symb} - X_d - X_{oh}$, and $X_d$ is the number of REs occupied by a demodulation reference signal (DMRS) in each PRB in the allocated duration, $X_{oh}$ is a total overhead occupied by a channel status indicator-reference signal (CSI-RS) and CORESET information, which is semi-statically determined, where the occupancy of the uplink and downlink may not be the same. After the intermediate value TBS_temp is obtained, the actual TBS is determined according to the channel coding. It has been determined that the TBS must meet the requirements including (a) the multiple of 8 and (b) the code block size (CBS) is equal for each code block after segmentation. The specific calculation method includes: based on the code block segmentation requirements, first determine the number of blocks C via the intermediate value, and then find the least common multiple of 8 and C, i.e. LCM (8, C), to quantify the TBS, that is: TBS=function(TBS_temp/δ)×δ, wherein, function(•) means rounding, rounding up, rounding down, or keeping the original value; δ is the quantization step size of TBS, its value is the least common multiple of 8 and code block number C, i.e. δ=LCM(8, C).

Figure 1B:
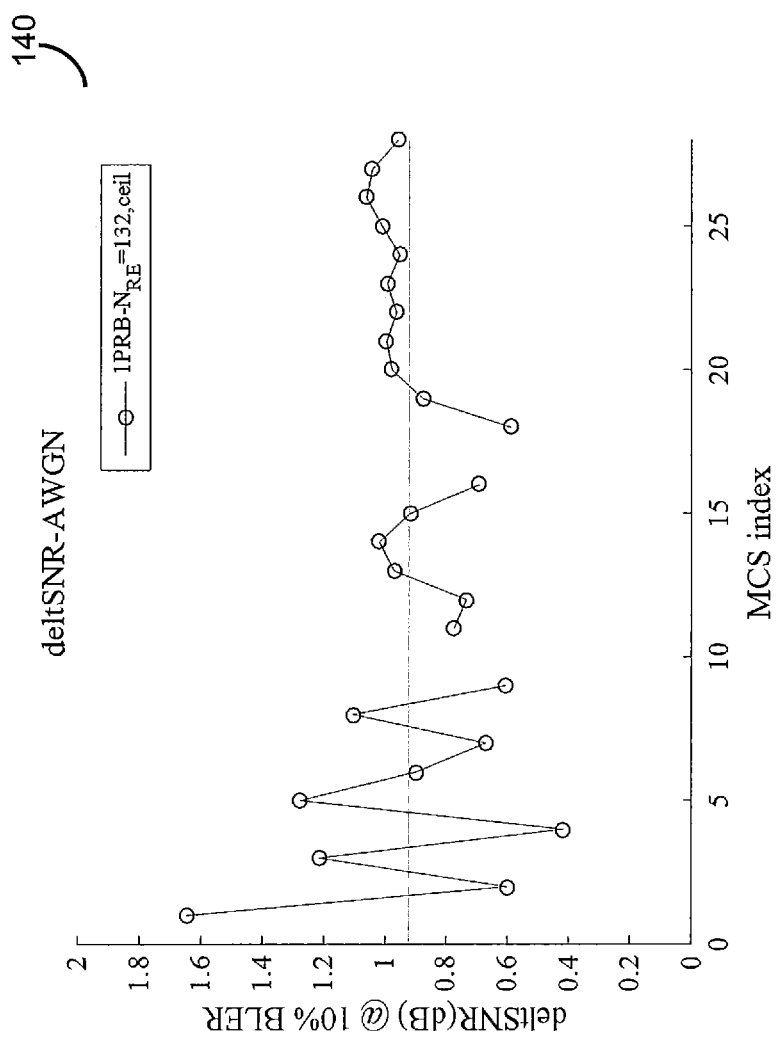
FIG. 1B illustrates an exemplary simulation result of link stability change vs. modulation and coding scheme (MCS) index, in accordance with an embodiment of prior art.

Based on the above mentioned method of determining the TBS, when the number of PRBs is small and the modulation order is low, the calculated TBS is small and may deviate from the actual transmitted TBS, resulting in a very unstable link. For example, when the number of allocated REs is 132, the number of PRBs is 1, and the number of layers is 1, a simulated link stability of the MCS table with a downlink 64-Quadrature Amplitude Modulation (64 QAM) is shown in the plot 140 of FIG. 1B. FIG. 1B utilizes deltaSNR (i.e. ΔSNR) to represent link stability with the TBS calculated using this method to achieve a target BLER=10%. As shown in FIG. 1B, when the MCS index is low, the deltaSNR fluctuates between 0.4 and 1.7, instead of stabilizing around 1.

Figure 1C:
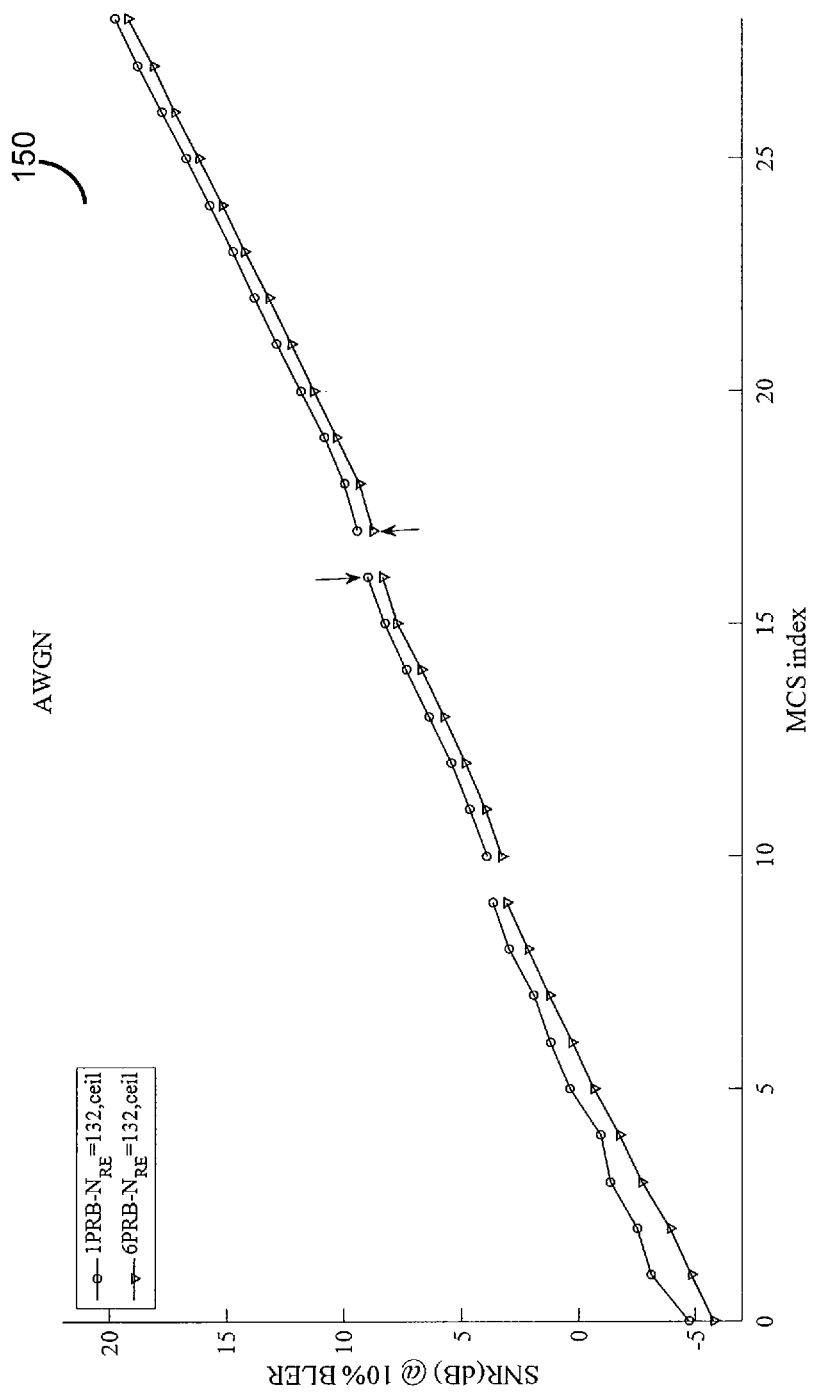
FIG. 1C illustrates an exemplary simulation result of signal-to-noise ratio (SNR) performance change vs. MCS index, in accordance with an embodiment of prior art.

FIG. 1C illustrates an exemplary simulation result 150 of signal-to-noise ratio (SNR) performance change vs. MCS index, based on the above mentioned method. As shown in FIG. 1C, when the MCS index is low (e.g. between 0 and 10), the SNR curve is not so smooth as the SNR curve when the MCS index is high (e.g. between 20 and 28). As shown in FIG. 1C, given an MCS index range (e.g. between 0 and 10), the SNR curve corresponding to a lower PRB=1 is not so smooth as the SNR curve corresponding to a higher PRB=6, where a smoother SNR curve indicates a more stable link.

Table 1D below shows the TBS values calculated based on the above mentioned method, with the allocated resource $N_{RE}^{PRB}=132$.

TABLE 1D

| MCS Index | $Q_m$ | PRB 1 | 2 | 3 | 4 | 5 | 6 |
|---|---|---|---|---|---|---|---|
| 0 | 2 | 16 | 48 | 80 | 112 | 144 | 176 |
| 1 | 2 | 32 | 72 | 112 | 152 | 192 | 232 |
| 2 | 2 | 40 | 88 | 136 | 184 | 240 | 288 |
| 3 | 2 | 56 | 120 | 184 | 248 | 312 | 376 |
| 4 | 2 | 64 | 144 | 224 | 304 | 384 | 464 |
| 5 | 2 | 88 | 184 | 280 | 376 | 472 | 576 |
| 6 | 2 | 104 | 216 | 336 | 448 | 568 | 680 |
| 7 | 2 | 120 | 256 | 392 | 528 | 664 | 800 |
| 8 | 2 | 144 | 296 | 456 | 608 | 768 | 920 |
| 9 | 2 | 160 | 336 | 512 | 688 | 864 | 1040 |
| 10 | 4 | 160 | 336 | 512 | 688 | 864 | 1040 |
| 11 | 4 | 184 | 376 | 576 | 768 | 960 | 1160 |
| 12 | 4 | 208 | 432 | 656 | 880 | 1104 | 1328 |
| 13 | 4 | 240 | 496 | 744 | 1000 | 1248 | 1504 |
| 14 | 4 | 272 | 560 | 840 | 1128 | 1416 | 1696 |
| 15 | 4 | 304 | 624 | 944 | 1256 | 1576 | 1896 |
| 16 | 4 | 328 | 664 | 1008 | 1344 | 1680 | 2024 |
| 17 | 6 | 328 | 664 | 1008 | 1344 | 1680 | 2024 |
| 18 | 6 | 352 | 712 | 1072 | 1432 | 1792 | 2152 |
| 19 | 6 | 384 | 784 | 1184 | 1584 | 1984 | 2384 |
| 20 | 6 | 424 | 864 | 1304 | 1744 | 2184 | 2616 |
| 21 | 6 | 464 | 944 | 1416 | 1896 | 2376 | 2848 |
| 22 | 6 | 504 | 1016 | 1536 | 2048 | 2560 | 3080 |
| 23 | 6 | 544 | 1104 | 1656 | 2216 | 2768 | 3328 |
| 24 | 6 | 584 | 1184 | 1776 | 2376 | 2976 | 3568 |
| 25 | 6 | 624 | 1264 | 1896 | 2536 | 3168 | 3808 |
| 26 | 6 | 664 | 1336 | 2016 | 2688 | 3368 | 4032 |
| 27 | 6 | 696 | 1400 | 2104 | 2808 | 3512 | 4208 |
| 28 | 6 | 720 | 1456 | 2184 | 2920 | 3656 | 4376 |

Table 1E below shows the simulated values of ΔSNR of adjacent MCSs, with the TBS values calculated based on the above mentioned method, the allocated resource $N_{RE}^{PRB}=132$, and a target BLER=10%.

TABLE 1E

| ΔSNR $I_{MCS}$ | PRB 1 | 2 | 3 | 4 | 5 | 6 |
|---|---|---|---|---|---|---|
| 0 | NaN | NaN | NaN | NaN | NaN | NaN |
| 1 | 1.6478 | 1.3574 | 1.2757 | 1.0864 | 1.0946 | 1.039 |
| 2 | 0.6008 | 0.6385 | 0.6852 | 0.7897 | 0.881 | 0.9065 |
| 3 | 1.2157 | 1.2039 | 1.2463 | 1.225 | 1.1019 | 1.1653 |
| 4 | 0.4161 | 0.792 | 0.9085 | 0.9571 | 0.9905 | 1.0053 |
| 5 | 1.2762 | 1.1092 | 1.008 | 1.0476 | 1.0161 | 1.0851 |
| 6 | 0.8967 | 0.8945 | 1.0217 | 0.9632 | 1.0167 | 0.9328 |
| 7 | 0.6697 | 0.9073 | 0.8472 | 0.9098 | 0.926 | 0.9555 |
| 8 | 1.104 | 0.9149 | 0.9392 | 0.9579 | 0.9554 | 0.9353 |
| 9 | 0.6058 | 0.8287 | 0.8787 | 0.8711 | 0.8573 | 0.9051 |
| 10 | NaN | NaN | NaN | NaN | NaN | NaN |
| 11 | 0.7741 | 0.709 | 0.7091 | 0.7192 | 0.6592 | 0.701 |
| 12 | 0.7335 | 0.8537 | 0.8488 | 0.8222 | 0.8916 | 0.8522 |
| 13 | 0.9696 | 0.9846 | 0.8929 | 0.9243 | 0.9018 | 0.91 |
| 14 | 1.0189 | 0.9393 | 0.9285 | 0.978 | 0.9589 | 0.9497 |
| 15 | 0.9166 | 0.9384 | 1.0292 | 0.9518 | 1.0096 | 1.0164 |
| 16 | 0.691 | 0.6064 | 0.6579 | 0.6382 | 0.606 | 0.6531 |
| 17 | NaN | NaN | NaN | NaN | NaN | NaN |
| 18 | 0.5871 | 0.6526 | 0.5133 | 0.5929 | 0.6074 | 0.5472 |
| 19 | 0.8761 | 0.8589 | 0.9683 | 0.9294 | 0.9598 | 0.9798 |
| 20 | 0.9768 | 1.0166 | 1.0144 | 1.0278 | 1.0026 | 0.9999 |
| 21 | 0.9947 | 0.992 | 0.9195 | 0.9368 | 0.9457 | 0.9483 |
| 22 | 0.962 | 0.8876 | 1.0037 | 0.9546 | 0.9617 | 0.9879 |
| 23 | 0.9928 | 1.1357 | 1.0201 | 1.0584 | 0.9959 | 0.9943 |
| 24 | 0.9511 | 0.9426 | 0.9596 | 0.9489 | 1.0049 | 0.9808 |
| 25 | 1.0099 | 1.0097 | 0.9852 | 1.0005 | 0.9711 | 1.0125 |
| 26 | 1.061 | 0.9384 | 1.0496 | 1.0067 | 1.0731 | 1.026 |
| 27 | 1.0414 | 1.0513 | 0.9398 | 0.9866 | 0.9268 | 0.9365 |
| 28 | 0.9567 | 1.0495 | 1.031 | 1.0579 | 1.0838 | 1.0464 |

In response to the link stability problem of the above mentioned method, the present disclosure provides a novel TBS calculation method to improve the above calculation formula of TBS, by introducing a correction factor, and determine the functional relationship between the relevant parameters, to ensure a stable link without losing flexibility.

In one embodiment, the novel TBS calculation method is designed by adding a correction factor β. The correction factor is a function of PRB number and/or MCS order and/or spectral efficiency (or code rate). For different PRB numbers and/or different MCS orders and/or different spectral efficiencies (or code rates), the value of β may be different.

In another embodiment, the novel TBS calculation method is designed by modifying the total number of REs. $N_{RE}$ is a function of PRB number and/or MCS order. For different PRB numbers and/or different MCS orders, the number of REs can be quantified differently.

In yet another embodiment, the novel TBS calculation method is designed by modifying the code rate or spectral efficiency. Each of them is a function of PRB number and/or MCS order. For different PRB numbers and/or different MCS orders, the value of code rate or spectral efficiency may be different.

The present disclosure provides a novel design of a set of available TBS values, by developing a fixed quantization step size for TBS in each given TBS range. Different quantization steps for TBS may be designed in different ranges; and the quantization step size increases when TBS increases. This can both ensure same TBS during initial transmission and retransmission, and ensure that the granularity of available TBS is not too low. The quantization step may also be a function of the number of PRBs and/or MCS orders and/or spectral efficiency and/or code rate.

Figure 2:
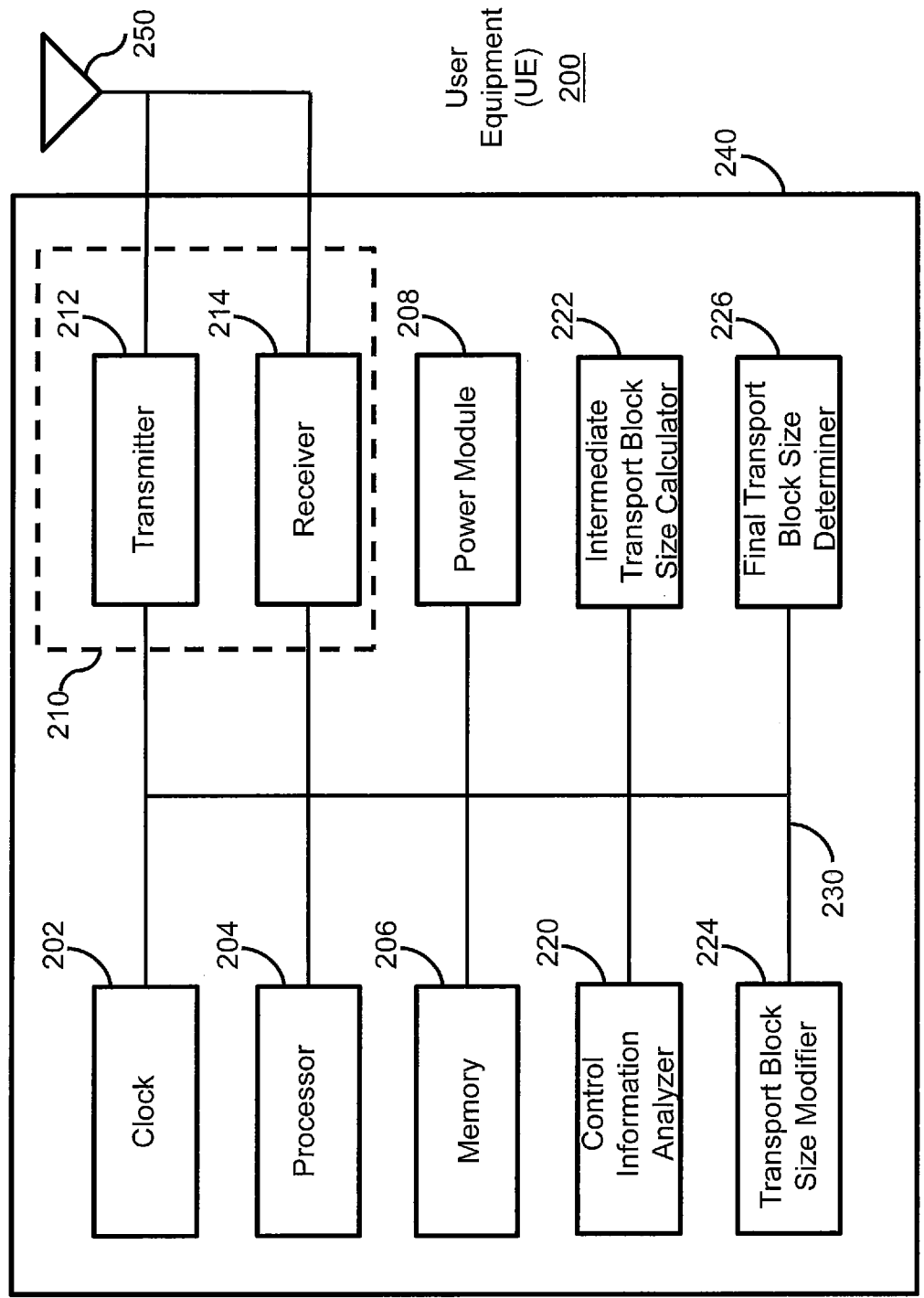
FIG. 2 illustrates a block diagram of a user equipment (UE), in accordance with some embodiments of the present disclosure.

FIG. 2 illustrates a block diagram of a user equipment (UE) 200, in accordance with some embodiments of the present disclosure. The UE 200 is an example of a device that can be configured to implement the various methods described herein. As shown in FIG. 2, the UE 200 includes a housing 240 containing a system clock 202, a processor 204, a memory 206, a transceiver 210 comprising a transmitter 212 and receiver 214, a power module 208, a control information analyzer 220, an intermediate transport block size calculator 222, a transport block size modifier 224, and a final transport block size determiner 226.

In this embodiment, the system clock 202 provides the timing signals to the processor 204 for controlling the timing of all operations of the UE 200. The processor 204 controls the general operation of the UE 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the UE 200 to transmit and receive data to and from a remote device (e.g., the BS or another UE). An antenna 250 is typically attached to the housing 240 and electrically coupled to the transceiver 210. In various embodiments, the UE 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

In a wireless communication, the UE 200 may receive control information from a BS. The control information may be downlink control information (DCI) in this embodiment. For example, the control information analyzer 220 may receive, via the receiver 214, DCI including a plurality of transmission parameters related to transport blocks to be transmitted between the UE 200 and the BS, e.g. from the BS to the UE 200. The control information analyzer 220 may analyze the DCI to identify the plurality of transmission parameters, which may include at least one of: a quantity of layers configured for transmission of the transport blocks; a modulation order configured for transmission of the transport blocks; a code rate configured for transmission of the transport blocks; a quantity of physical resource blocks configured for transmission of the transport blocks; a quantity of resource elements per each physical resource block; a total quantity of resource elements for transmission of the transport blocks, which is a product of the quantity of physical resource blocks and the quantity of resource elements per physical resource block; and a spectral efficiency configured for transmission of the transport blocks, which is equal to a product of the modulation order and the code rate. The control information analyzer 220 may send the analyzed DCI including the plurality of transmission parameters to the intermediate transport block size calculator 222 for calculating an intermediate transport block size (TBS), and to the transport block size modifier 224 for modifying the intermediate TBS to generate a modified TBS.

The intermediate transport block size calculator 222 in this example receives the analyzed DCI including the plurality of transmission parameters from the control information analyzer 220. Based on the plurality of transmission parameters, the intermediate transport block size calculator 222 calculates an intermediate TBS for the transport blocks to be transmitted from the BS to the UE 200. In one embodiment, the intermediate transport block size calculator 222 can calculate the intermediate TBS based on the above mentioned method corresponding to FIG. 1B and FIG. 1C. The intermediate transport block size calculator 222 transmits the intermediate TBS to the transport block size modifier 224 for modifying the intermediate TBS to generate a modified TBS.

The transport block size modifier 224 in this example can receive the plurality of transmission parameters from the control information analyzer 220 and receive the intermediate TBS from the intermediate transport block size calculator 222. The transport block size modifier 224 first determines whether a condition is met based on at least one of the plurality of transmission parameters and at least one threshold. In one embodiment, the condition is met when at least one of the following happens: the quantity of physical resource blocks is smaller than or equal to a first threshold, e.g. 2; the modulation order is smaller than or equal to a second threshold, e.g. 4; the total quantity of resource elements is smaller than a third threshold; and the intermediate transport block size is smaller than a fourth threshold, e.g. 4000.

When the condition is met, the transport block size modifier 224 modifies the intermediate transport block size to generate a modified transport block size. In one embodiment, when the condition is met, the transport block size modifier 224 determines a correction factor based on at least one of: the quantity of physical resource blocks, and the modulation order and the spectral efficiency, and multiplies the intermediate transport block size by the correction factor to generate the modified transport block size.

In another embodiment, when the condition is met, the transport block size modifier 224 determines a modified quantity of resource elements based on the total quantity of resource elements and a set of resource element quantities after quantization, and replaces the total quantity of resource elements with the modified quantity of resource elements in the calculation of the intermediate transport block size to generate the modified transport block size.

In yet another embodiment, when the condition is met, the transport block size modifier 224 determines a modified code rate based on at least one of: the quantity of physical resource blocks and the modulation order and the spectral efficiency, and replaces the code rate with the modified code rate in the calculation of the intermediate transport block size to generate the modified transport block size.

In a different embodiment, the modified transport block size includes bits for cyclic redundancy check (CRC) of each of the transport blocks. Transmission of the transport blocks based on a calculated transport block size leads to a better link stability when the calculated transport block size is the modified transport block size than that when the calculated transport block size is the intermediate transport block size. The link stability may be determined based on a change of a signal-to-noise ratio required to achieve a target block error rate for transmission of the transport blocks, given a discrepancy between the calculated transport block size and an actual transport block size used for the transmission. The transport block size modifier 224 transmits the modified TBS to the final transport block size determiner 226 for determining a final TBS for transmission of the transport blocks.

The final transport block size determiner 226 in this example may receive the plurality of transmission parameters from the control information analyzer 220, and receive the modified TBS from the transport block size modifier 224. The final transport block size determiner 226 can determine a final transport block size based on the modified transport block size for transmission of the transport blocks.

In one embodiment, the final transport block size determiner 226 generates a quantized set of transport block sizes, where a quantization step, from a transport block to next transport block in the quantized set, is a function of at least one of the following transmission parameters: the quantity of physical resource blocks, the modulation order and the spectral efficiency. The final transport block size determiner 226 then determines the final transport block size based on a transport block size that is closest to the modified transport block size, among transport block sizes that are in the quantized set and not smaller than the modified transport block size.

In another embodiment, the final transport block size determiner 226 rounds up the modified transport block size to a closest larger integer to generate an integer transport block size; determines a quantity of code blocks in each of the transport blocks based on the integer transport block size and a block segmentation rule related to channel coding; and calculates the final transport block size based on the integer transport block size and the quantity of code blocks to ensure the multiple of 8 and equal code block size after block segmentation of the transport blocks. For example, the final transport block size determiner 226 can determine a least common multiple of eight and the quantity of code blocks; and determine the final transport block size based on an integer that is closest to the integer transport block size, among integers that are divisible by the least common multiple and not smaller than the integer transport block size. Because one byte includes eight bits, being divisible by the least common multiple of eight and the quantity of code blocks ensures both the multiple of 8 and equal code block size after block segmentation of the transport blocks.

In the present disclosure, the expressions "X is divisible by Y" and "X is evenly divisible by Y" can be used interchangeably to mean that X is a (positive integer) multiple of Y and there is no remainder.

In yet another embodiment, the final transport block size determiner 226 generates a quantized set of transport block sizes, where the quantization step, from a transport block to next transport block in the quantized set, increases as the transport block size increases. The final transport block size determiner 226 then determines the final transport block size based on a transport block size that is closest to the modified transport block size, among transport block sizes that are in the quantized set and not smaller than the modified transport block size.

In still another embodiment, the final transport block size determiner 226 generates a quantized set of transport block sizes, where the quantization step, from a transport block to next transport block in the quantized set, is determined to ensure granularity of the quantized set is larger than a threshold; and determines the final transport block size based on a transport block size that is closest to the modified transport block size, among transport block sizes that are in the quantized set and not smaller than the modified transport block size. In this embodiment, the quantization step is determined to ensure that the final transport block size is the same for both an initial transmission and a re-transmission of a transport block.

The power module 208 can include a power source such as one or more batteries, and a power regulator, to provide regulated power to each of the above-described modules in FIG. 2. In some embodiments, if the UE 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the UE 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the intermediate transport block size calculator 222. Conversely, each of the modules illustrated in FIG. 2 can be implemented using a plurality of separate components or elements.

Figure 3:
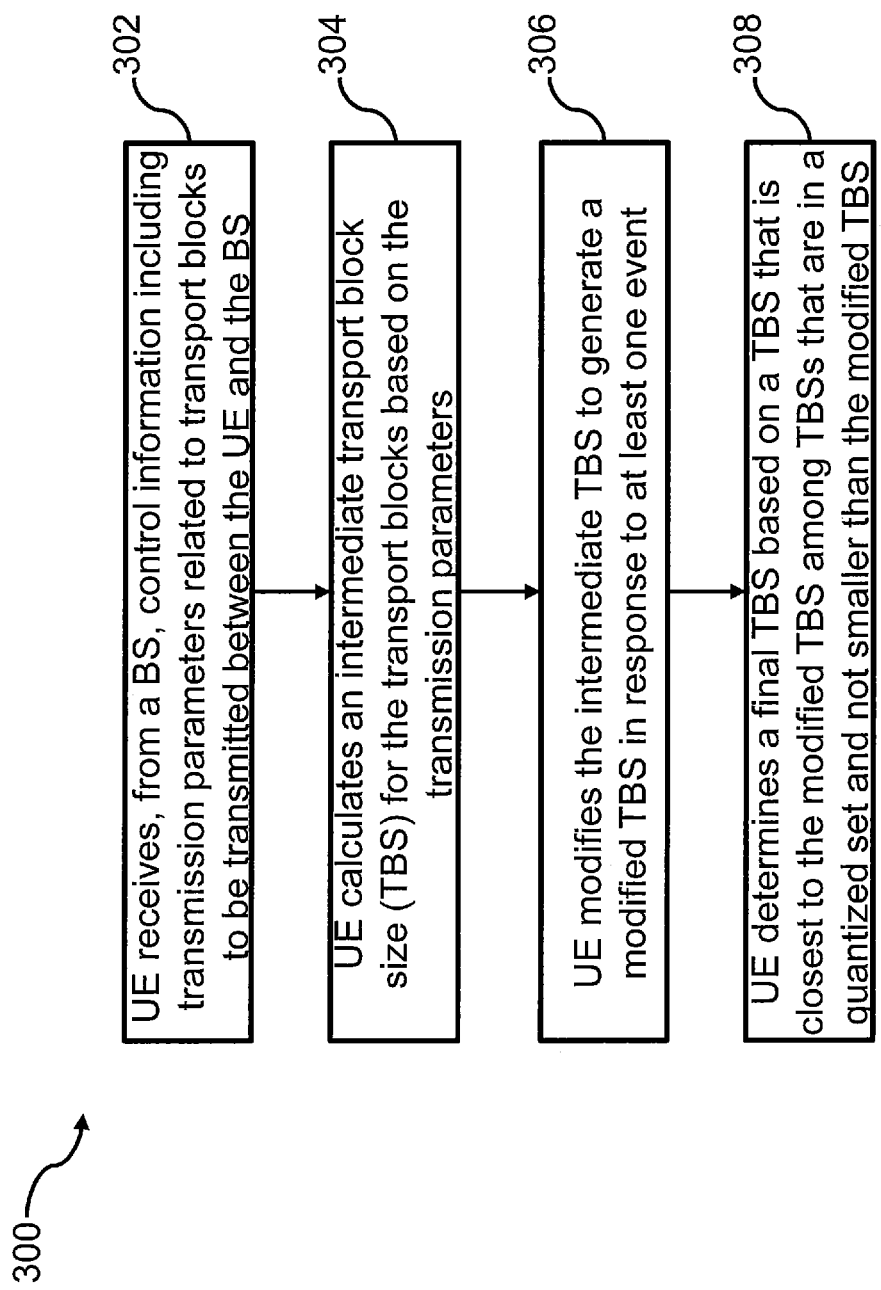
FIG. 3 illustrates a flow chart for a method performed by a UE for determining a transport block size in a wireless communication, in accordance with some embodiments of the present disclosure.

FIG. 3 illustrates a flow chart for a method 300 performed by a UE, e.g. the UE 200 in FIG. 2, for determining a transport block size in a wireless communication, in accordance with some embodiments of the present disclosure. At operation 302, the UE receives, from a BS, control information including transmission parameters related to transport blocks to be transmitted between the UE and the BS. At operation 304, the UE calculates an intermediate transport block size for the transport blocks based on the transmission parameters. The UE modifies at operation 306 the intermediate transport block size to generate a modified transport block size in response to at least one event. At operation 308, the UE determines a final transport block size based on a transport block size that is closest to the modified transport block size among transport block sizes that are in a quantized set and not smaller than the modified transport block size.

Figure 4:
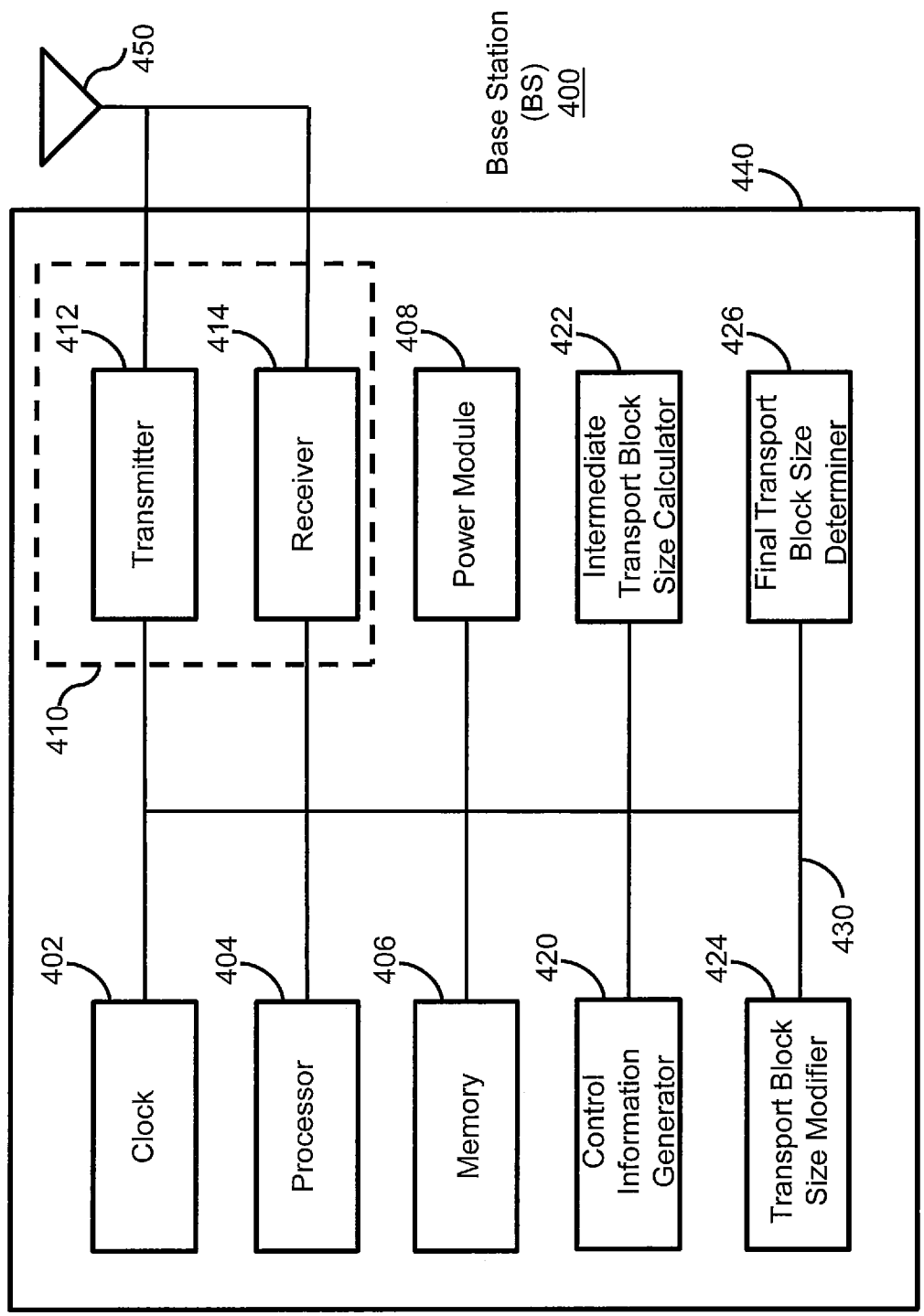
FIG. 4 illustrates a block diagram of a base station (BS), in accordance with some embodiments of the present disclosure.

FIG. 4 illustrates a block diagram of a BS 400, in accordance with some embodiments of the present disclosure. The BS 400 is an example of a device that can be configured to implement the various methods described herein. As shown in FIG. 4, the BS 400 includes a housing 440 containing a system clock 402, a processor 404, a memory 406, a transceiver 410 comprising a transmitter 412 and a receiver 414, a power module 408, a control information generator 420, an intermediate transport block size calculator 422, a transport block size modifier 424, and a final transport block size determiner 426.

In this embodiment, the system clock 402, the processor 404, the memory 406, the transceiver 410 and the power module 408 work similarly to the system clock 202, the processor 204, the memory 206, the transceiver 210 and the power module 208 in the UE 200. An antenna 450 or a multi-antenna array 450 is typically attached to the housing 440 and electrically coupled to the transceiver 410.

The control information generator 420 may generate a plurality of transmission parameters related to transport blocks to be transmitted between the BS 400 and a UE, e.g. from the BS 400 to the UE 200. The plurality of transmission parameters may include at least one of: a quantity of layers configured for transmission of the transport blocks; a modulation order configured for transmission of the transport blocks; a code rate configured for transmission of the transport blocks; a quantity of physical resource blocks configured for transmission of the transport blocks; a quantity of resource elements per each physical resource block; a total quantity of resource elements for transmission of the transport blocks, which is a product of the quantity of physical resource blocks and the quantity of resource elements per physical resource block; and a spectral efficiency configured for transmission of the transport blocks, which is equal to a product of the modulation order and the code rate. The control information generator 420 may send the generated transmission parameters to the intermediate transport block size calculator 422 for calculating an intermediate transport block size (TBS), and to the transport block size modifier 424 for modifying the intermediate TBS to generate a modified TBS. The control information generator 420 also generates and transmits, via the transmitter 412, control information that includes the plurality of transmission parameters and a transport block size, e.g. a final transport block size as discussed later, to the UE.

In one embodiment, the control information is downlink control information (DCI). In one example, the final transport block size is determined by the BS 400, such that the BS informs the UE 200 about the final transport block size via the DCI. In another example, the final transport block size is determined by the UE 200, such that the DCI transmitted by the BS 400 does not include the final transport block size. In yet another example, the final transport block size is determined by both the BS 400 and the UE 200 according to the same rule, such that the DCI transmitted by the BS 400 does not include the final transport block size.

The intermediate transport block size calculator 422 in this example receives the plurality of transmission parameters from the control information generator 420. Based on the plurality of transmission parameters, the intermediate transport block size calculator 422 calculates an intermediate TBS for the transport blocks to be transmitted from the BS 400 to the UE 200. In one embodiment, the intermediate transport block size calculator 422 can calculate the intermediate TBS based on the above mentioned method corresponding to FIG. 1B and FIG. 1C. The intermediate transport block size calculator 422 transmits the intermediate TBS to the transport block size modifier 424 for modifying the intermediate TBS to generate a modified TBS.

The transport block size modifier 424 in this example can receive the plurality of transmission parameters from the control information generator 420 and receive the intermediate TBS from the intermediate transport block size calculator 422. The transport block size modifier 424 first determines whether a condition is met based on at least one of the plurality of transmission parameters and at least one threshold. In one embodiment, the condition is met when at least one of the following happens: the quantity of physical resource blocks is smaller than or equal to a first threshold, e.g. 2; the modulation order is smaller than or equal to a second threshold, e.g. 4; the total quantity of resource elements is smaller than a third threshold; and the intermediate transport block size is smaller than a fourth threshold, e.g. 4000.

When the condition is met, the transport block size modifier 424 modifies the intermediate transport block size to generate a modified transport block size. In one embodiment, when the condition is met, the transport block size modifier 424 determines a correction factor based on at least one of: the quantity of physical resource blocks, and the modulation order and the spectral efficiency, and multiplies the intermediate transport block size by the correction factor to generate the modified transport block size.

In another embodiment, when the condition is met, the transport block size modifier 424 determines a modified quantity of resource elements based on the total quantity of resource elements and a set of resource element quantities after quantization, and replaces the total quantity of resource elements with the modified quantity of resource elements in the calculation of the intermediate transport block size to generate the modified transport block size.

In yet another embodiment, when the condition is met, the transport block size modifier 424 determines a modified code rate based on at least one of: the quantity of physical resource blocks and the modulation order and the spectral efficiency, and replaces the code rate with the modified code rate in the calculation of the intermediate transport block size to generate the modified transport block size.

In a different embodiment, the modified transport block size includes bits for CRC of each of the transport blocks. Transmission of the transport blocks based on a calculated transport block size leads to a better link stability when the calculated transport block size is the modified transport block size than that when the calculated transport block size is the intermediate transport block size. The link stability may be determined based on a change of a signal-to-noise ratio required to achieve a target block error rate for transmission of the transport blocks, given a discrepancy between the calculated transport block size and an actual transport block size used for the transmission. The transport block size modifier 424 sends the modified TBS to the final transport block size determiner 426 for determining a final TBS for transmission of the transport blocks.

The final transport block size determiner 426 in this example may receive the plurality of transmission parameters from the control information generator 420, and receive the modified TBS from the transport block size modifier 424. The final transport block size determiner 426 can determine a final transport block size based on the modified transport block size for transmission of the transport blocks.

In one embodiment, the final transport block size determiner 426 generates a quantized set of transport block sizes, where a quantization step, from a transport block to next transport block in the quantized set, is a function of at least one of the following transmission parameters: the quantity of physical resource blocks, the modulation order and the spectral efficiency. The final transport block size determiner 426 then determines the final transport block size based on a transport block size that is closest to the modified transport block size, among transport block sizes that are in the quantized set and not smaller than the modified transport block size.

In another embodiment, the final transport block size determiner 426 rounds up the modified transport block size to a closest larger integer to generate an integer transport block size; determines a quantity of code blocks in each of the transport blocks based on the integer transport block size and a block segmentation rule related to channel coding; and calculates the final transport block size based on the integer transport block size and the quantity of code blocks to ensure the multiple of 8 and equal code block size after block segmentation of the transport blocks. For example, the final transport block size determiner 426 can determine a least common multiple of eight and the quantity of code blocks; and determine the final transport block size based on an integer that is closest to the integer transport block size, among integers that are divisible by the least common multiple and not smaller than the integer transport block size. Because one byte includes eight bits, being divisible by the least common multiple of eight and the quantity of code blocks ensures both the multiple of 8 and equal code block size after block segmentation of the transport blocks.

In yet another embodiment, the final transport block size determiner 426 generates a quantized set of transport block sizes, where the quantization step, from a transport block to next transport block in the quantized set, increases as the transport block size increases. The final transport block size determiner 426 then determines the final transport block size based on a transport block size that is closest to the modified transport block size, among transport block sizes that are in the quantized set and not smaller than the modified transport block size.

In still another embodiment, the final transport block size determiner 426 generates a quantized set of transport block sizes, where the quantization step, from a transport block to next transport block in the quantized set, is determined to ensure granularity of the quantized set is larger than a threshold; and determines the final transport block size based on a transport block size that is closest to the modified transport block size, among transport block sizes that are in the quantized set and not smaller than the modified transport block size. In this embodiment, the quantization step is determined to ensure that the final transport block size is the same for both an initial transmission and a re-transmission of a transport block.

The various modules discussed above are coupled together by a bus system 430. The bus system 430 can include a data bus and, for example, a power bus, a control signal bus, and/or a status signal bus in addition to the data bus. It is understood that the modules of the BS 400 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 404 can implement not only the functionality described above with respect to the processor 404, but also implement the functionality described above with respect to the intermediate transport block size calculator 422. Conversely, each of the modules illustrated in FIG. 4 can be implemented using a plurality of separate components or elements.

Figure 5:
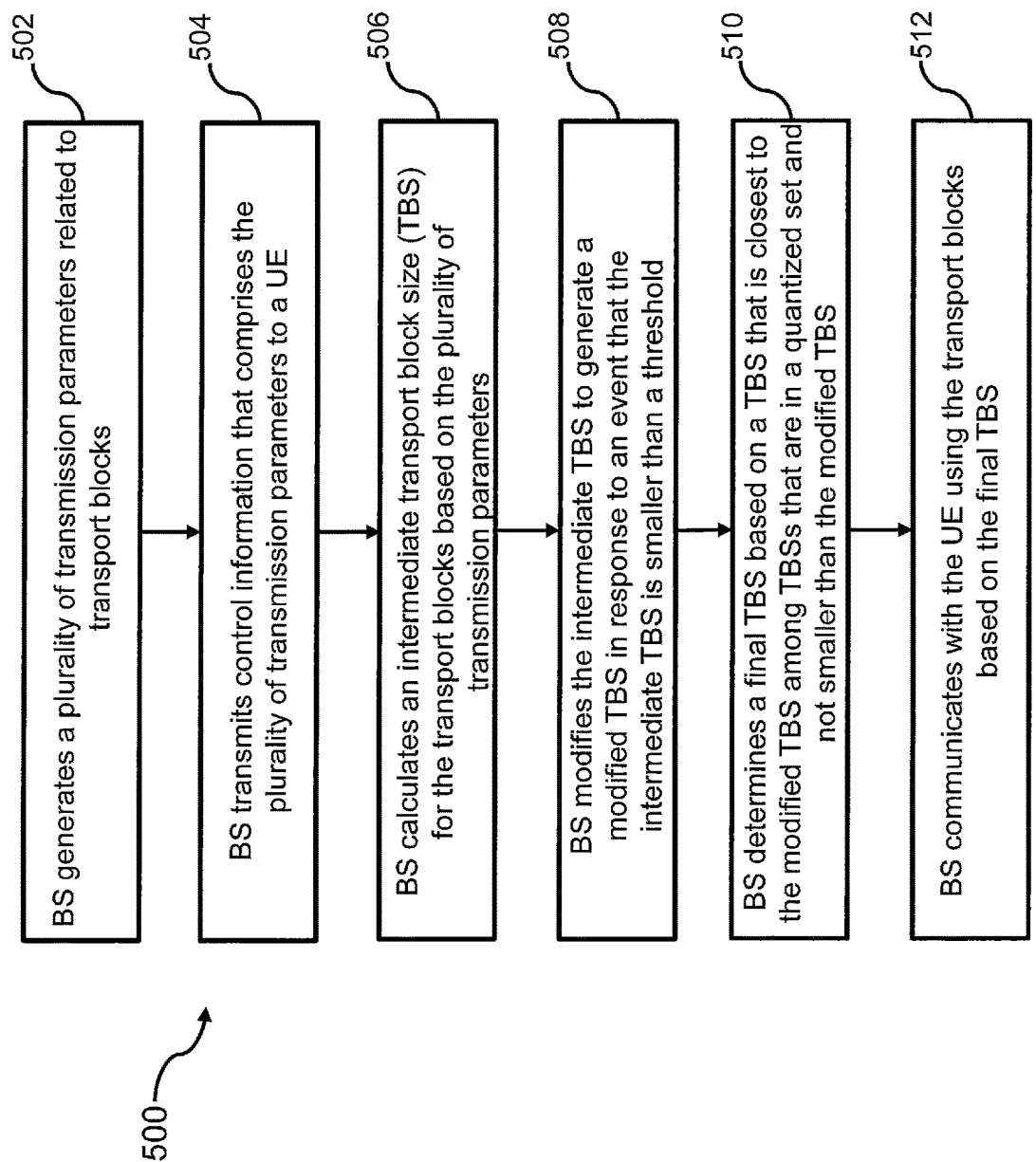
FIG. 5 illustrates a flow chart for a method performed by a BS for determining a transport block size in a wireless communication, in accordance with some embodiments of the present disclosure.

FIG. 5 illustrates a flow chart for a method 500 performed by a BS, e.g. the BS 400 in FIG. 4, for determining a transport block size in a wireless communication, in accordance with some embodiments of the present disclosure. At operation 502, the BS generates a plurality of transmission parameters related to transport blocks. At operation 504, the BS transmits control information that comprises the plurality of transmission parameters to a UE. At operation 506, the BS calculates an intermediate transport block size for the transport blocks based on the plurality of transmission parameters. The BS modifies at operation 508 the intermediate transport block size to generate a modified transport block size in response to an event that the intermediate TBS is smaller than a threshold. The BS determines at operation 510 a final transport block size based on a transport block size that is closest to the modified transport block size among transport block sizes that are in a quantized set and not smaller than the modified transport block size. At operation 512, the BS communicates with the UE using the transport blocks based on the final transport block size.

In one embodiment, the roles of the BS 400 and the UE 200 in FIGS. 2-5 are exchanged, where the UE 200 generates and transmits uplink control information to the BS 400. The TBS is calculated and determined for transport blocks to be transmitted from the UE 200 to the BS 400 for uplink transmissions, in a similar manner to the manner discussed above for downlink transmissions.

Different embodiments of the present disclosure will now be described in detail hereinafter. It is noted that the features of the embodiments and examples in the present disclosure may be combined with each other in any manner without conflict.

According to various embodiments of the present disclosure, a TBS calculation method is provided and can be applied to a new radio (NR) access technology communication system. The method proposed in the present disclosure may be applied to a fifth generation (5G) mobile communication system or other wireless or wired communication system. The data transmission direction is that a base station sends data (downlink transmission service data) to a mobile user or a mobile user sends data (uplink transmission service data) to the base station. Mobile users include: mobile devices, access terminals, user terminals, subscriber stations, subscriber units, mobile stations, remote stations, remote terminals, user agents, user equipment, user devices, or some other terminology. The base station includes: an access point (AP), a node B, a radio network controller (RNC), an evolved Node B (eNB), a base station controller (BSC), Base Transceiver Station (BTS), a Base Station (BS), a Transceiver Function (TF), a radio router, a radio transceiver, a basic service unit, an extension service unit, a Radio Base Station (RBS), or some other terminology. A TBS calculation method provided in the present disclosure may be applied to an enhanced Mobile Broadband (eMBB) scenario, an ultra-reliable low-latency communications (URLLC) scenario or a massive Machine Type Communications (mMTC) scenario, in the NR access technology.

In a first embodiment, the functional model for TBS calculation is: TBS=F(β), with a specific form shown as follows:

$$TBS = \text{function}\left(\frac{\text{function}(\beta \times \text{function}(Q_m \times R \times v \times Y \times N_{PRB}^{XL}))}{\delta}\right) \times \delta.$$

In the above formula, the correction factor β is a function of (a) the number of PRBs allocated for uplink or downlink, and/or (b) the order of the modulation and coding $Q_m$, and/or (c) the code rate R (or spectrum efficiency); function(•) indicates rounding, rounding up, rounding down, or retaining the original value; Y is the quantized value of X that is the number of REs per PRB; δ is the quantization step of the TBS. Since the correction factor is mainly added to improve the link stability when the PRB is small and when the order of the MCS is low, the value of β can be determined by $Q_m$ and $N_{PRB}^{XL}$.

In a first situation, when the PRB is small and/or the MCS order is low, the correction factor is set to be a fraction close to 1, e.g. 0.9. For the sake of simple hardware implementation, the value of the correction factor can be taken as $$\frac{2^{n1}-1}{2^{n1}}.$$

In a second situation, when the MCS order is high and the allocated spectrum efficiency (SE) is the same as the SE at the modulation order hopping (where the modulation order changes from an MCS index to an adjacent MCS index in the MCS table) in the MCS table, the correction factor is also set to be a fraction close to 1, e.g. 0.94. For the sake of simple hardware implementation, the value of the correction factor can be taken as $$\frac{2^{n2}-1}{2^{n2}}.$$

In general, the correction factor in the second situation is larger than that in the first situation. When the RE value in each PRB changes, the correspondingly obtained link stability will also change. Therefore, the values of the correction factors may be different for different RE values. For example, when the RE value in each PRB is 120, the correction factor can be set to be 1.

When the PRB is larger and/or the order of the MCS is higher, the value of the correction factor is set to be 1. Because when the PRB is larger and the MCS is higher, the TBS is larger, and the interval of actually available TBSs is also larger. Therefore, the calculated TBS does not need to be modified to obtain good link stability.

According to one example, the value of the correction factor β is shown in the following table:

| $N_{PRB}$ | β | $Q_m$ $S_{lowerMCS}$ | $S_{higherMCS}$ at SE overlap | $S_{higherMCS}$ not at SE overlap |
|---|---|---|---|---|
| ≤x | | $\beta = \frac{31}{32}$ | β = 63/64 | β = 1 |
| >x | β = 1 | | | |

The functional model of the correction factor β is shown below:

$$\beta = \begin{cases} \frac{2^{n1}-1}{2^{n1}}, n1为正整数 & N_{PRB}^{XL} < x, (\text{or})Q_m \in S_{lower\_MCS} \\ \frac{2^{n2}-1}{2^{n2}}, n2为正整数 & Q_m \in S_{overlappingSE\_higherMCS} \\ 1 & \text{else.} \end{cases}$$

In the above, x indicates the number of PRBs, for example, x=6; $S_{lowerMCS}$ represents a set of $Q_m$ values in lower-order modulation; $S_{higherMCS}$ represents a set of $Q_m$ values in higher-order modulation, $S_{overlappingSE\_high\_higherMCS}$ represents a larger $Q_m$ value of two different modulation orders at SE overlap (where the SE value does not change from an MCS index to an adjacent MCS index in the MCS table) in higher-order modulation. When the number of PRBs is small and the order of MCS is low, the value $\beta=(2^n-1)/2^n$ can not only achieve better performance but also be easy to implement by hardware. For example, when the value of n1 is 5, β=31/32; when the value of n2 is 6, β=63/64. In the process of hardware implementation, one just needs to truncate the TBS or intermediate TBS (referred to as TBS_temp) and perform a subtraction to complete a corresponding multiplication of β.

The steps to determine TBS in this embodiment include the following:

Step 1, according to the obtained transmission parameters $Q_m$, R, v, Y and $N_{PRB}^{XL}$, determine the value of β based on the number of PRBs and the MCS order.

Step 2, calculate the TBS intermediate value TBS_temp, which can be divided into two cases.

In case 1: First, the formula $Q_m \times R \times v \times Y \times N_{PRB}^{XL}$ is used to calculate and round up to obtain TBS_temp. The TBS_temp is divided into blocks according to the code block segmentation rule of the channel coding. Note that TBS_temp includes the transport block CRC check bits (TB_CRC). Second, correct TBS_temp by multiplying it with the correction factor β. Finally, assuming that the number of code blocks that need to be transmitted is C, in order to obtain the TBS with the multiple of 8 and equal CBS, it is required that TBS_temp can be divisible by the LCM (8, C) which is the least common multiple of 8 and C. The formula for this process is shown below:

$$TBS = \text{ceil}\left(\beta \times \frac{TBS\_temp}{LCM(8, C)}\right) \times LCM(8, C).$$

In case 2: formula $\beta \times Q_m \times R \times v \times Y \times N_{PRB}^{XL}$ is used to calculate the modified TBS_temp. The TBS_temp is divided into blocks according to the code block segmentation rule of the channel coding. Note that TBS_temp includes the transport block CRC check bits (TB_CRC). Assuming that the number of code blocks that need to be transmitted is C, in order to obtain the TBS with the multiple of 8 and equal CBS, it is required that TBS_temp can be divisible by the LCM (8, C) which is the least common multiple of 8 and C. The formula for this process is shown below:

$$TBS = \text{ceil}\left(\frac{\beta \times Q_m \times R \times v \times Y \times N_{PRB}^{XL}}{LCM(8, C)}\right) \times LCM(8, C).$$

Figure 6A:
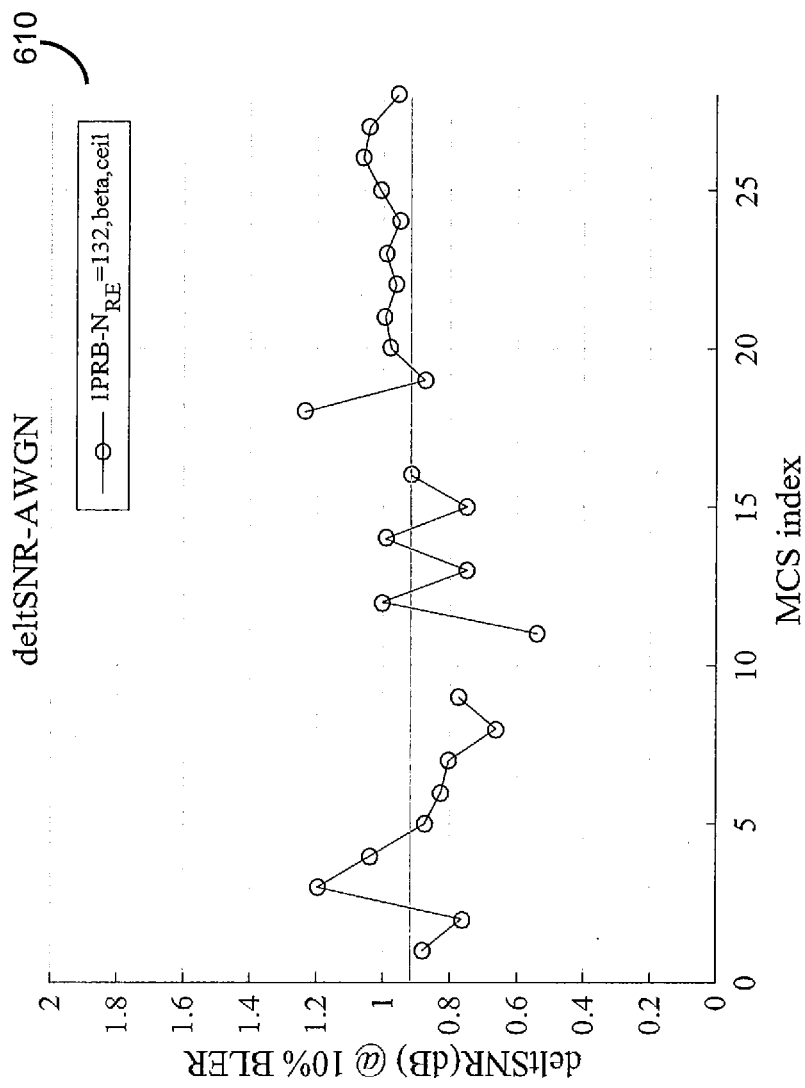
FIG. 6a illustrates an exemplary simulation result of link stability changes vs. MCS index, in accordance with an embodiment of the present disclosure.

FIG. 6A illustrates an exemplary simulation result 610 of link stability changes vs. MCS index, in accordance with this embodiment. FIG. 6A utilizes deltaSNR (i.e. ΔSNR) to represent link stability with the TBS calculated and modified using the method in this embodiment to achieve a target BLER=10%. As shown in FIG. 6A, when the MCS index is low (e.g. between 0 and 10), the deltaSNR fluctuates between 0.6 and 1.2, less than the fluctuation in the same MCS range shown in FIG. 1B.

Figure 6B:
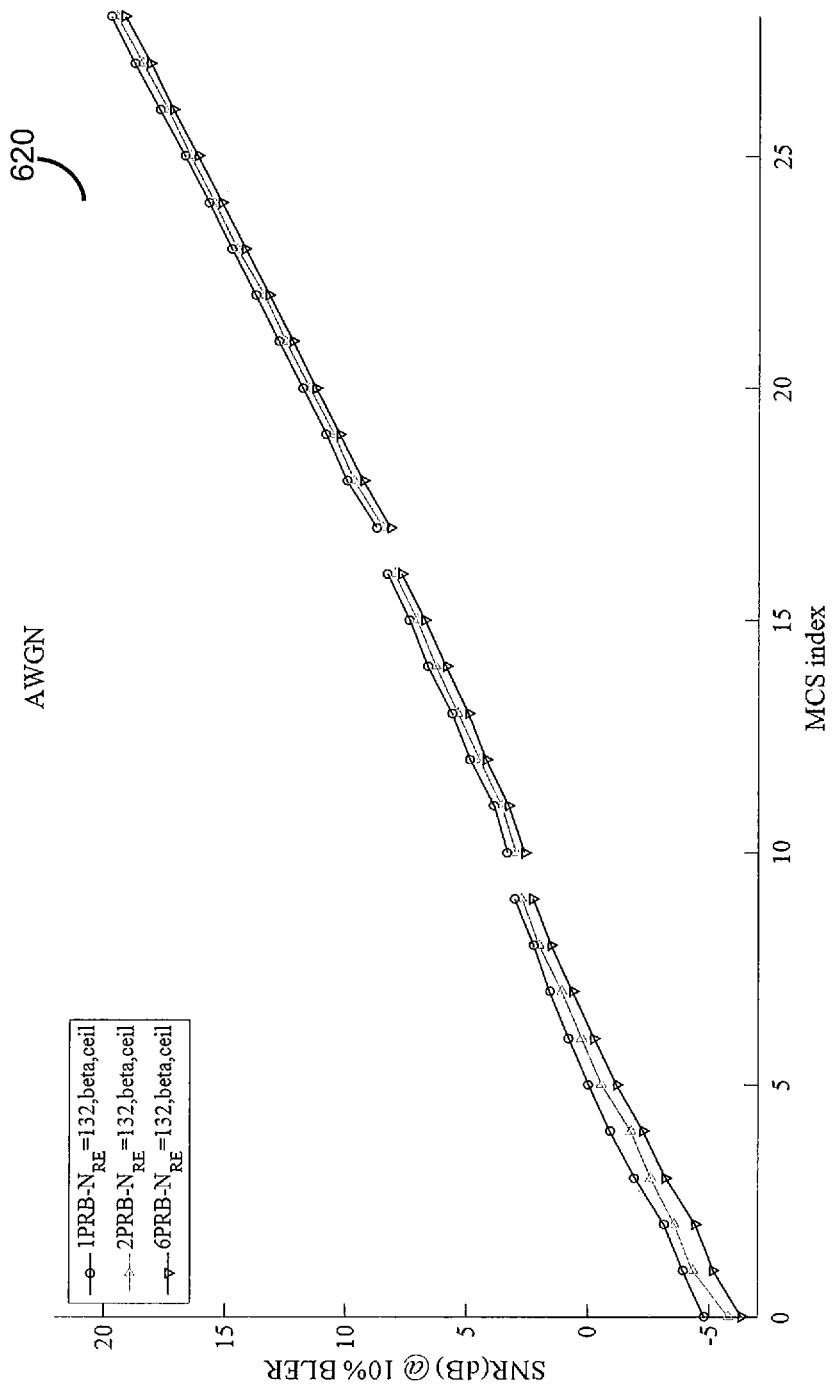
FIG. 6B illustrates an exemplary simulation result of SNR performance changes vs. MCS index, in accordance with an embodiment of the present disclosure.

FIG. 6B illustrates an exemplary simulation result 620 of SNR performance change vs. MCS index, in accordance with this embodiment. As shown in FIG. 6B, when the MCS index is low (e.g. between 0 and 10), the SNR curve is not so smooth as the SNR curve when the MCS index is high (e.g. between 20 and 28). As shown in FIG. 6B, given an MCS index range (e.g. between 0 and 10), the SNR curve corresponding to a lower PRB, e.g. when PRB=1, is not so smooth as the SNR curve corresponding to a higher PRB, e.g. when PRB=6, where a smoother SNR curve indicates a more stable link.

Table 6C below shows the TBS values calculated and corrected with the correction factor β based on the above mentioned method in the first embodiment, with the allocated resource $N_{RE}^{PRB}$=132.

TABLE 6C

| MCS Index | $Q_m$ | PRB | | | | | |
|---|---|---|---|---|---|---|---|
| | | 1 | 2 | 3 | 4 | 5 | 6 |
| 0 | 2 | 16 | 40 | 72 | 96 | 128 | 152 |
| 1 | 2 | 24 | 64 | 96 | 136 | 168 | 208 |
| 2 | 2 | 32 | 80 | 120 | 168 | 216 | 256 |
| 3 | 2 | 48 | 104 | 160 | 224 | 280 | 336 |
| 4 | 2 | 64 | 128 | 200 | 272 | 344 | 416 |
| 5 | 2 | 80 | 168 | 256 | 344 | 432 | 520 |
| 6 | 2 | 96 | 200 | 304 | 408 | 512 | 616 |
| 7 | 2 | 112 | 232 | 352 | 480 | 600 | 720 |
| 8 | 2 | 128 | 272 | 408 | 552 | 688 | 832 |
| 9 | 2 | 144 | 304 | 464 | 624 | 776 | 936 |
| 10 | 4 | 144 | 304 | 464 | 624 | 776 | 936 |
| 11 | 4 | 160 | 336 | 512 | 688 | 864 | 1040 |
| 12 | 4 | 192 | 392 | 592 | 800 | 1000 | 1200 |
| 13 | 4 | 216 | 448 | 672 | 904 | 1128 | 1352 |
| 14 | 4 | 248 | 504 | 760 | 1016 | 1272 | 1528 |
| 15 | 4 | 272 | 560 | 848 | 1136 | 1424 | 1704 |
| 16 | 4 | 304 | 624 | 944 | 1264 | 1576 | 1896 |
| 17 | 6 | 304 | 624 | 944 | 1264 | 1576 | 1896 |
| 18 | 6 | 352 | 712 | 1072 | 1432 | 1792 | 2152 |
| 19 | 6 | 384 | 784 | 1184 | 1584 | 1984 | 2384 |
| 20 | 6 | 424 | 864 | 1304 | 1744 | 2184 | 2616 |
| 21 | 6 | 464 | 944 | 1416 | 1896 | 2376 | 2848 |
| 22 | 6 | 504 | 1016 | 1536 | 2048 | 2560 | 3080 |
| 23 | 6 | 544 | 1104 | 1656 | 2216 | 2768 | 3328 |
| 24 | 6 | 584 | 1184 | 1776 | 2376 | 2976 | 3568 |
| 25 | 6 | 624 | 1264 | 1896 | 2536 | 3168 | 3808 |
| 26 | 6 | 664 | 1336 | 2016 | 2688 | 3368 | 4032 |
| 27 | 6 | 696 | 1400 | 2104 | 2808 | 3512 | 4208 |
| 28 | 6 | 720 | 1456 | 2184 | 2920 | 3656 | 4376 |

Table 6D below shows the simulated values of ΔSNR of adjacent MCSs, with the TBS values calculated and corrected with the correction factor β based on the above mentioned method in the first embodiment, the allocated resource $N_{RE}^{PRB}$=132, and a target BLER=10%.

TABLE 6D

| ΔSNR | PRB | | | | | |
|---|---|---|---|---|---|---|
| $I_{MCS}$ | 1 | 2 | 3 | 4 | 5 | 6 |
| 0 | NaN | NaN | NaN | NaN | NaN | NaN |
| 1 | 0.882 | 0.9434 | 0.9743 | 0.9459 | 1.1174 | 1.1051 |
| 2 | 1.3666 | 1.0525 | 0.9866 | 0.9302 | 0.8929 | 0.9062 |
| 3 | 0.5966 | 0.9564 | 1.0075 | 1.1155 | 1.2236 | 1.1064 |
| 4 | 1.0352 | 1.0395 | 0.9661 | 0.9521 | 0.9512 | 0.996 |
| 5 | 0.8758 | 0.8822 | 1.1017 | 1.0529 | 1.0496 | 1.0664 |
| 6 | 1.2971 | 1.1215 | 0.9428 | 0.9689 | 0.9141 | 0.9764 |
| 7 | 0.6697 | 0.6795 | 0.8543 | 0.8507 | 0.946 | 0.9578 |
| 8 | 0.6752 | 0.9349 | 0.9246 | 0.9338 | 0.9039 | 0.8493 |
| 9 | 1.0346 | 0.8551 | 0.7767 | 0.7691 | 0.8518 | 0.8983 |
| 10 | NaN | NaN | NaN | NaN | NaN | NaN |
| 11 | 0.9388 | 0.879 | 0.9649 | 0.9198 | 0.869 | 0.9092 |
| 12 | 0.7335 | 0.8537 | 0.8488 | 0.8222 | 0.8916 | 0.8522 |
| 13 | 0.9696 | 0.9846 | 0.8929 | 0.9243 | 0.9018 | 0.91 |
| 14 | 1.0189 | 0.9393 | 0.9285 | 0.978 | 0.9589 | 0.9497 |
| 15 | 0.9166 | 0.9384 | 1.0292 | 0.9518 | 1.0096 | 1.0164 |
| 16 | 1.0535 | 0.9027 | 0.9588 | 0.9697 | 0.9185 | 0.9621 |
| 17 | NaN | NaN | NaN | NaN | NaN | NaN |
| 18 | 0.813 | 0.9208 | 0.7866 | 0.8594 | 0.9083 | 0.8108 |
| 19 | 0.8761 | 0.8589 | 0.9683 | 0.9294 | 0.9598 | 0.9798 |
| 20 | 0.9768 | 1.0166 | 1.0144 | 1.0278 | 1.0026 | 0.9999 |
| 21 | 0.9947 | 0.992 | 0.9195 | 0.9368 | 0.9457 | 0.9483 |
| 22 | 0.962 | 0.8876 | 1.0037 | 0.9546 | 0.9617 | 0.9879 |
| 23 | 0.9928 | 1.1357 | 1.0201 | 1.0584 | 0.9959 | 0.9943 |
| 24 | 0.9511 | 0.9426 | 0.9596 | 0.9489 | 1.0049 | 0.9808 |
| 25 | 1.0099 | 1.0097 | 0.9852 | 1.0005 | 0.9711 | 1.0125 |
| 26 | 1.061 | 0.9384 | 1.0496 | 1.0067 | 1.0731 | 1.026 |
| 27 | 1.0414 | 1.0513 | 0.9398 | 0.9866 | 0.9268 | 0.9365 |
| 28 | 0.9567 | 1.0495 | 1.031 | 1.0579 | 1.0838 | 1.0464 |

In a second embodiment, the functional model for TBS calculation is: TBS=F($N_{RE}$), with a specific form shown as follows:

$$TBS = \text{function}\left(\frac{\text{function}(Q_m \times R \times v \times N_{RE})}{\delta}\right) \times \delta.$$

In the above formula, $N_{RE}$ represents the number of REs allocated, i.e. $N_{RE}=Y \times N_{PRB}^{XL}$; the value of $N_{RE}$ is a function of the order of the modulation and coding $Q_m$; function (•) indicates rounding, rounding up, rounding down, or retaining the original value; Y is the quantized value of X that is the number of REs per PRB; δ is the quantization step of the TBS. The modification on $N_{RE}$ is to improve the link stability when the number of total REs is small and the order of the MCS is low. The modified value of $N_{RE}$ is taken as follows.

In a first situation, when the total number of REs is small and the MCS modulation order is low, the total number of REs is set to be the minimum value or any other value of the RE set after quantization. For example, the RE set after quantization is $S_Y$={120, 126, 132 . . . }, then 120 is taken as the total number of REs calculated by TBS. In a second situation, when the total number of REs is high or the MCS modulation order is high, the total number of REs is set to be the total number of REs calculated by the allocated parameters, that is, $N_{RE}=Y \times N_{PRB}^{XL}$.

According to one example, the total number of REs is set in the following table:

| $Q_m$ $N_{RE}$ | | |
|---|---|---|
| $N_{RE}$ | $S_{lower\_MCS}$ | $S_{higher\_MCS}$ |
| ≤x | $N_{RE}'$(a value in $S_Y$) | $N_{RE}$ |
| >x | $N_{RE}$ | $N_{RE}$ |

The functional model of the total number of REs is shown below:

$$N_{RE} = \begin{cases} \min(S_Y) & N_{RE} \leq x, Q_m \in S_{lower\_MCS}, \\ Y \times N_{PRB}^{XL} & \text{else.} \end{cases}$$

In the above, the value of x is generally 280; $S_{lower\_MCS}$ represents a set of $Q_m$ values for a lower-order MCS. For example, $S_{lower\_MCS}=\{2, 4\}$, i.e. the value of $Q_m$ may be 2 or 4. $S_Y$ is a collection of values for Y, for example $S_Y=\{120, 126, 132, \Lambda\}$; min (SY) represents the minimum value in the set of values of Y.

The steps to determine TBS in this embodiment include the following:

Step 1, according to the obtained transmission parameters $Q_m$, R, v, Y and $N^{XL}_{PRB}$, determine the value of $N_{RE}$.

Step 2, based on $Q_m \times R \times v \times N_{RE}$, calculate and round up to obtain TBS_temp. The TBS_temp includes the transport block CRC check bits (TB_CRC).

Step 3, the TBS_temp is divided into blocks according to the code block segmentation rule of the channel coding. Assuming that the number of divided code blocks is C, to ensure that the TBS bytes are aligned and the sizes of the divided code blocks are equal, the TBS_temp needs to be divisible by the LCM (8, C). The formula for this process is as follows $$TBS = \text{function}\left(\frac{TBS\_temp}{LCM(8, C)}\right) \times LCM(8, C).$$

Figure 7A:
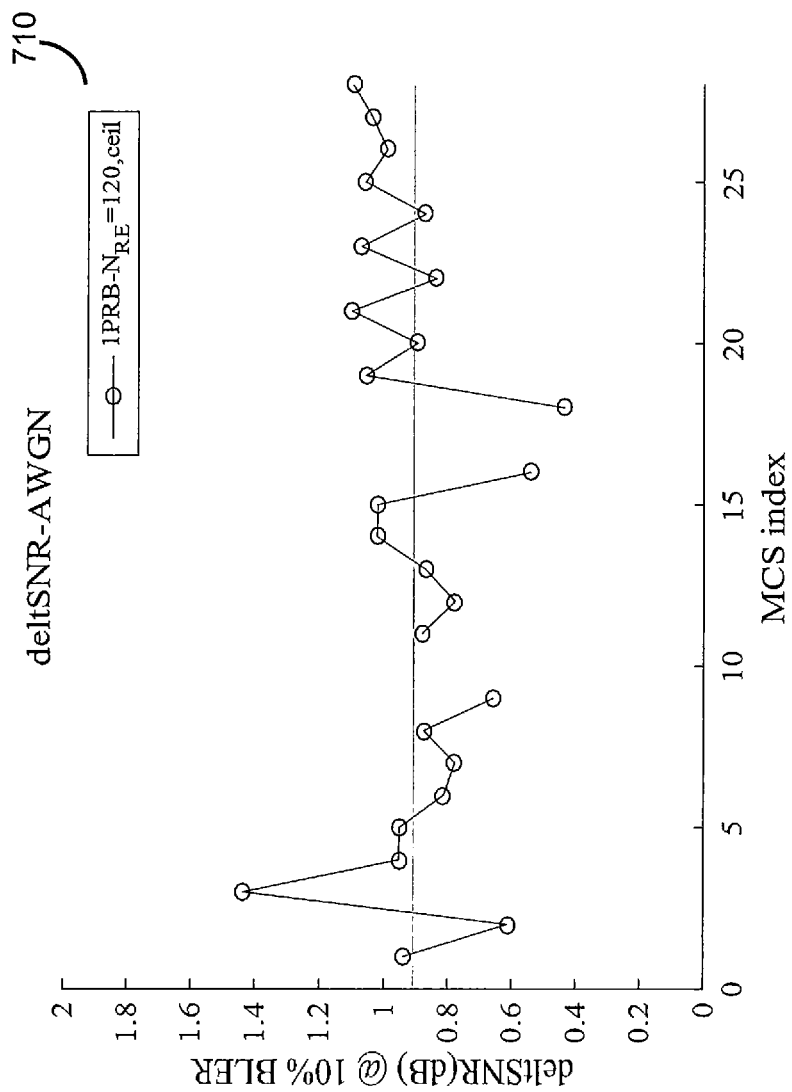
FIG. 7A illustrates another exemplary simulation result of link stability changes vs. MCS index, in accordance with an embodiment of the present disclosure.

FIG. 7A illustrates an exemplary simulation result 710 of link stability changes vs. MCS index, in accordance with this embodiment. FIG. 7A utilizes deltaSNR (i.e. ΔSNR) to represent link stability with the TBS calculated and modified using the method in this embodiment to achieve a target BLER=10%. As shown in FIG. 7A, when the MCS index is low (e.g. between 0 and 10), the deltaSNR fluctuates between 0.6 and 1.5, less than the fluctuation in the same MCS range shown in FIG. 1B.

Figure 7B:
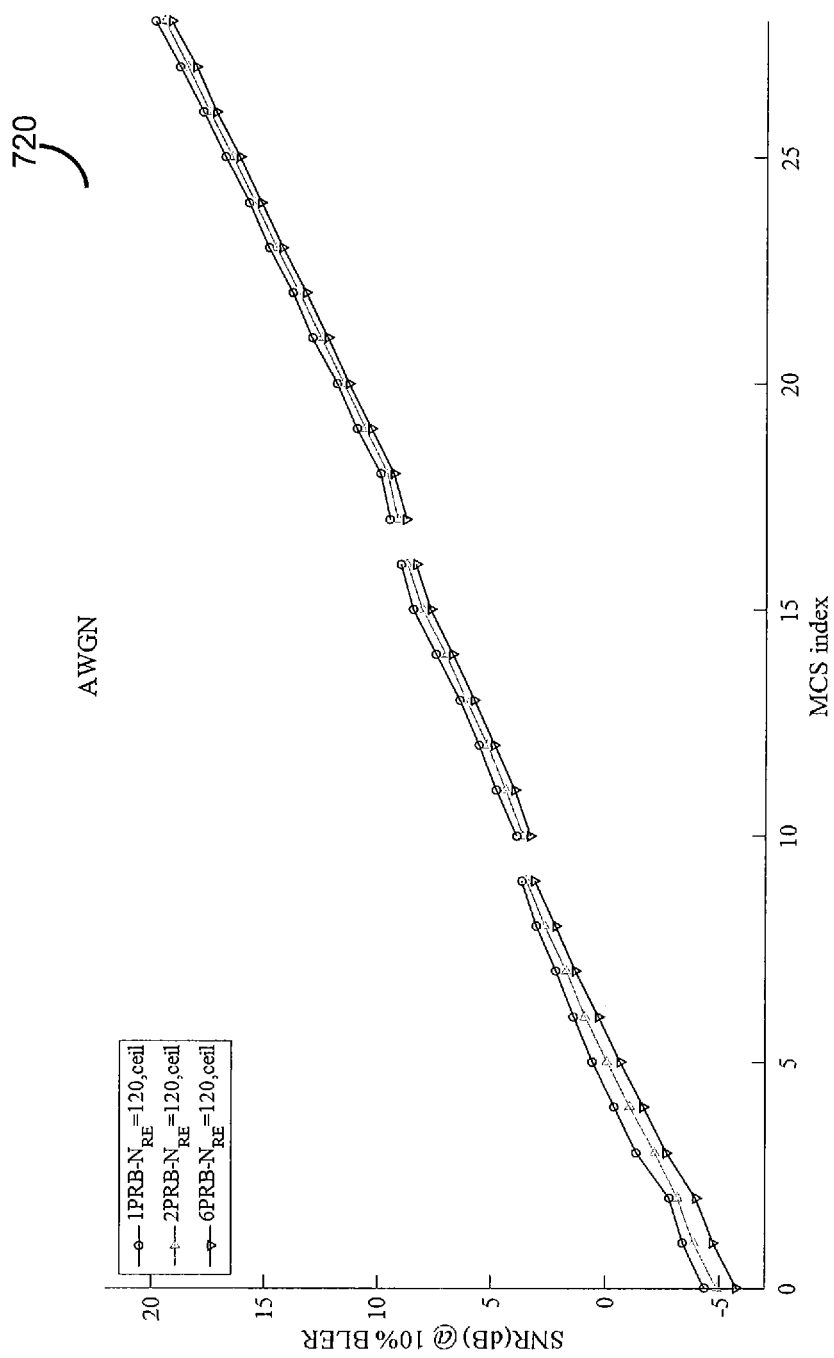
FIG. 7B illustrates another exemplary simulation result of SNR performance changes vs. MCS index, in accordance with an embodiment of the present disclosure.

FIG. 7B illustrates an exemplary simulation result 720 of SNR performance change vs. MCS index, in accordance with this embodiment. As shown in FIG. 7B, when the MCS index is low (e.g. between 0 and 10), the SNR curve is not so smooth as the SNR curve when the MCS index is high (e.g. between 20 and 28). As shown in FIG. 7B, given an MCS index range (e.g. between 0 and 10), the SNR curve corresponding to a lower PRB, e.g. when PRB=1, is not so smooth as the SNR curve corresponding to a higher PRB, e.g. when PRB=6, where a smoother SNR curve indicates a more stable link.

Table 7C below shows the TBS values calculated based on the above mentioned method in the second embodiment, with the new RE value constraint $N_{RE}$=120.

TABLE 7C

| MCS Index | $Q_m$ | PRB 1 | 2 | 3 | 4 | 5 | 6 |
|---|---|---|---|---|---|---|---|
| 0 | 2 | 16 | 48 | 72 | 104 | 128 | 160 |
| 1 | 2 | 24 | 64 | 96 | 136 | 168 | 208 |
| 2 | 2 | 32 | 80 | 120 | 168 | 216 | 256 |
| 3 | 2 | 48 | 104 | 168 | 224 | 280 | 344 |
| 4 | 2 | 64 | 136 | 208 | 280 | 352 | 424 |
| 5 | 2 | 80 | 168 | 256 | 344 | 432 | 520 |
| 6 | 2 | 96 | 200 | 304 | 408 | 512 | 616 |
| 7 | 2 | 112 | 232 | 360 | 480 | 600 | 728 |
| 8 | 2 | 128 | 272 | 408 | 552 | 696 | 832 |
| 9 | 2 | 144 | 304 | 464 | 624 | 784 | 944 |
| 10 | 4 | 144 | 304 | 464 | 624 | 784 | 944 |
| 11 | 4 | 168 | 344 | 520 | 696 | 872 | 1048 |
| 12 | 4 | 192 | 392 | 600 | 800 | 1008 | 1208 |
| 13 | 4 | 216 | 448 | 680 | 904 | 1136 | 1368 |
| 14 | 4 | 248 | 504 | 768 | 1024 | 1288 | 1544 |
| 15 | 4 | 280 | 568 | 856 | 1144 | 1432 | 1720 |
| 16 | 4 | 296 | 608 | 912 | 1224 | 1528 | 1840 |
| 17 | 6 | 296 | 608 | 912 | 1224 | 1528 | 1840 |
| 18 | 6 | 312 | 640 | 968 | 1296 | 1624 | 1952 |
| 19 | 6 | 352 | 712 | 1080 | 1440 | 1800 | 2168 |
| 20 | 6 | 384 | 784 | 1184 | 1584 | 1984 | 2384 |
| 21 | 6 | 424 | 856 | 1288 | 1720 | 2152 | 2592 |
| 22 | 6 | 456 | 928 | 1392 | 1864 | 2328 | 2800 |
| 23 | 6 | 496 | 1000 | 1504 | 2008 | 2512 | 3024 |
| 24 | 6 | 528 | 1072 | 1616 | 2160 | 2704 | 3248 |
| 25 | 6 | 568 | 1144 | 1720 | 2304 | 2880 | 3456 |
| 26 | 6 | 600 | 1216 | 1832 | 2440 | 3056 | 3672 |
| 27 | 6 | 632 | 1272 | 1912 | 2552 | 3192 | 3824 |
| 28 | 6 | 656 | 1320 | 1984 | 2656 | 3320 | 3976 |

Table 7D below shows the simulated values of ΔSNR of adjacent MCSs, with the TBS values calculated based on the above mentioned method in the second embodiment, with the new RE value constraint $N_{RE}^{PRB}$=120, and a target BLER=10%.

TABLE 7D

| ΔSNR $I_{MCS}$ | PRB 1 | 2 | 3 | 4 | 5 | 6 |
|---|---|---|---|---|---|---|
| 0 | NaN | NaN | NaN | NaN | NaN | NaN |
| 1 | 0.9395 | 0.9991 | 0.9941 | 1.0927 | 1.0634 | 1.0445 |
| 2 | 0.6133 | 0.7165 | 0.8077 | 0.7349 | 0.9629 | 0.7704 |
| 3 | 1.4353 | 0.9961 | 1.425 | 1.2235 | 1.114 | 1.2909 |
| 4 | 0.9522 | 1.082 | 0.9337 | 1.0087 | 1.0691 | 0.9922 |
| 5 | 0.9507 | 0.9945 | 0.9161 | 1.0164 | 1.0182 | 1.0252 |
| 6 | 0.8129 | 0.9562 | 0.9854 | 0.9 | 0.9077 | 0.947 |
| 7 | 0.779 | 0.8148 | 0.9742 | 0.937 | 0.9459 | 0.9895 |
| 8 | 0.8754 | 0.9602 | 0.729 | 0.9308 | 0.9566 | 0.8835 |
| 9 | 0.6579 | 0.8066 | 0.9538 | 0.8757 | 0.8866 | 0.9261 |
| 10 | NaN | NaN | NaN | NaN | NaN | NaN |
| 11 | 0.8816 | 0.7628 | 0.7236 | 0.701 | 0.6642 | 0.6828 |
| 12 | 0.7783 | 0.8063 | 0.9026 | 0.8606 | 0.9443 | 0.8973 |
| 13 | 0.8709 | 0.9668 | 0.8987 | 0.8787 | 0.8811 | 0.9138 |
| 14 | 1.0217 | 0.8844 | 0.9758 | 0.9619 | 0.9731 | 0.9531 |
| 15 | 1.0197 | 1.0427 | 0.9511 | 1.0282 | 0.9549 | 0.9805 |
| 16 | 0.5405 | 0.656 | 0.6022 | 0.6477 | 0.6221 | 0.6473 |
| 17 | NaN | NaN | NaN | NaN | NaN | NaN |
| 18 | 0.434 | 0.4394 | 0.5284 | 0.4999 | 0.5586 | 0.5556 |
| 19 | 1.0579 | 0.9871 | 1.0226 | 1.0412 | 0.9797 | 1.0054 |
| 20 | 0.8967 | 0.9857 | 0.9636 | 0.96 | 1.0236 | 1.0035 |
| 21 | 1.1022 | 0.9963 | 0.9381 | 0.9424 | 0.9095 | 0.9463 |
| 22 | 0.837 | 0.9637 | 0.9214 | 0.9688 | 0.943 | 0.9515 |
| 23 | 1.0724 | 1.0106 | 1.0391 | 1.014 | 1.0355 | 1.0252 |
| 24 | 0.8719 | 0.9567 | 0.9895 | 0.9685 | 1.0087 | 0.9627 |
| 25 | 1.0593 | 0.9947 | 0.9792 | 1.0231 | 0.9781 | 0.9634 |
| 26 | 0.9921 | 1.0381 | 1.0595 | 0.9889 | 1.0206 | 1.0489 |
| 27 | 1.0388 | 0.9775 | 0.9344 | 0.9696 | 0.9725 | 0.8906 |
| 28 | 1.0985 | 1.0231 | 1.0326 | 1.1254 | 1.0628 | 1.1204 |

In a third embodiment, the functional model for TBS calculation is: TBS=F(R), with a specific form shown as follows:

$$TBS = \text{function}\left(\frac{\text{function}(Q_m \times R \times v \times Y \times N_{PRB}^{XL})}{\delta}\right) \times \delta.$$

In the above formula, the code rate R is a function of (a) the number of PRBs allocated for the downlink or uplink, and (b) the order of the modulation and coding $Q_m$; function (•) indicates rounding, rounding up, rounding down, or retaining the original value; Y is the quantized value of X that is the number of REs per PRB; δ is the quantization step of the TBS. The modification on the code rate R or the spectrum efficiency SE is mainly to improve the link stability when the PRB is small and the order of the MCS is low. The modified value of R or SE can be determined according to the following two situations.

In a first situation, when the number of PRBs is small, or the modulation order of MCS is low, or the modulation order of MCS is high but at the SE overlap (where the SE value does not change from an MCS index to an adjacent MCS index in the MCS table), the code rate R or spectrum efficiency SE in the MCS table is corrected to obtain R' or SE'. In this case, R' or SE' is used to calculate the code rate or spectrum efficiency of the TBS. For example, when the $I_{MCS}$ in the downlink 64 QAM MCS table is 0~17, the value of R' may be {0.1064, 0.1387, 0.1816, 0.2227, 0.2734, 0.3359, 0.3984, 0.4668, 0.5342, 0.6025, 0.3018, 0.3359, 0.3857, 0.4346, 0.4912, 0.5469, 0.6055, 0.4033}, or the value of SE' may be {0.2131, 0.2779, 0.3627, 0.4448, 0.5469, 0.6721, 0.7973, 0.9331, 1.0689, 1.2056, 1.2056, 1.3424, 1.5412, 1.7401, 1.9638, 2.1818, 2.42, 2.42}. In a second situation, when the number of PRBs is large, or the MCS modulation order is high but not at the SE overlap (where the SE value does not change from an MCS index to an adjacent MCS index in the MCS table), the corresponding code rate R in the MCS table is used to calculate the TBS.

The functional model of the code rate R is shown below:

$$R = \begin{cases} R' & N_{PRB}^{XL} \leq x, \text{ (or)} Q_m \in S_{lower\_MCS} \cup S_{overlappingSE\_high\_higherMCS}, \\ R & \text{else.} \end{cases}$$

The functional model of the spectral efficiency SE is shown below:

$$SE = \begin{cases} SE' & N_{PRB}^{XL} \leq x, \text{ (or)} Q_m \in S_{lower\_MCS} \cup S_{overlappingSE\_high\_higherMCS}, \\ SE & \text{else.} \end{cases}$$

Here, x is the number of PRBs allocated, for example, x has a value of 6.

According to one example, the values of code rate and spectral efficiency are set in the following table, for a downlink 64 QAM:

| MCS Index $I_{MCS}$ | Modulation Order $Q_m$ | CodeRate*1024 R | CodeRate*1024 R' | SE | SE' |
|---|---|---|---|---|---|
| 0 | 2 | 120 | 109 | 0.2344 | 0.2131 |
| 1 | 2 | 157 | 142 | 0.3057 | 0.2779 |
| 2 | 2 | 193 | 186 | 0.377 | 0.3627 |
| 3 | 2 | 251 | 228 | 0.4893 | 0.4448 |
| 4 | 2 | 308 | 280 | 0.6016 | 0.5469 |
| 5 | 2 | 379 | 344 | 0.7393 | 0.6721 |
| 6 | 2 | 449 | 408 | 0.877 | 0.7973 |
| 7 | 2 | 526 | 478 | 1.0264 | 0.9331 |
| 8 | 2 | 602 | 547 | 1.1758 | 1.0689 |
| 9 | 2 | 679 | 617 | 1.3262 | 1.2056 |
| 10 | 4 | 340 | 309 | 1.3262 | 1.2056 |
| 11 | 4 | 378 | 344 | 1.4766 | 1.3424 |
| 12 | 4 | 434 | 395 | 1.69535 | 1.5412 |
| 13 | 4 | 490 | 445 | 1.9141 | 1.7401 |
| 14 | 4 | 553 | 503 | 2.1602 | 1.9638 |
| 15 | 4 | 616 | 560 | 2.4063 | 2.1875 |
| 16 | 4 | 658 | 620 | 2.5684 | 2.42 |
| 17 | 6 | 438 | 413 | 2.5684 | 2.42 |
| 18 | 6 | 466 | 466 | 2.7305 | 2.7305 |
| 19 | 6 | 517 | 517 | 3.0264 | 3.0264 |
| 20 | 6 | 567 | 567 | 3.3223 | 3.3223 |
| 21 | 6 | 616 | 616 | 3.6123 | 3.6123 |
| 22 | 6 | 666 | 666 | 3.9023 | 3.9023 |
| 23 | 6 | 719 | 719 | 4.21285 | 4.21285 |
| 24 | 6 | 772 | 772 | 4.5234 | 4.5234 |
| 25 | 6 | 822 | 822 | 4.8193 | 4.8193 |
| 26 | 6 | 873 | 873 | 5.1152 | 5.1152 |
| 27 | 6 | 910 | 910 | 5.33495 | 5.33495 |
| 28 | 6 | 948 | 948 | 5.5547 | 5.5547 |

The steps to determine TBS in this embodiment include the following:

Step 1, according to the obtained transmission parameters $Q_m$, R, v, Y and $N^{XL}_{PRB}$, determine the value of code rate R. When the number of PRBs is small and the MCS modulation order is low, R=R'; when the number of PRBs is large or the MCS modulation order is high, R=R.

Step 2, based on $Q_m \times R \times v \times N_{RE}$, calculate and round up to obtain TBS_temp. The TBS_temp includes the transport block CRC check bits (TB_CRC).

Figure 8A:
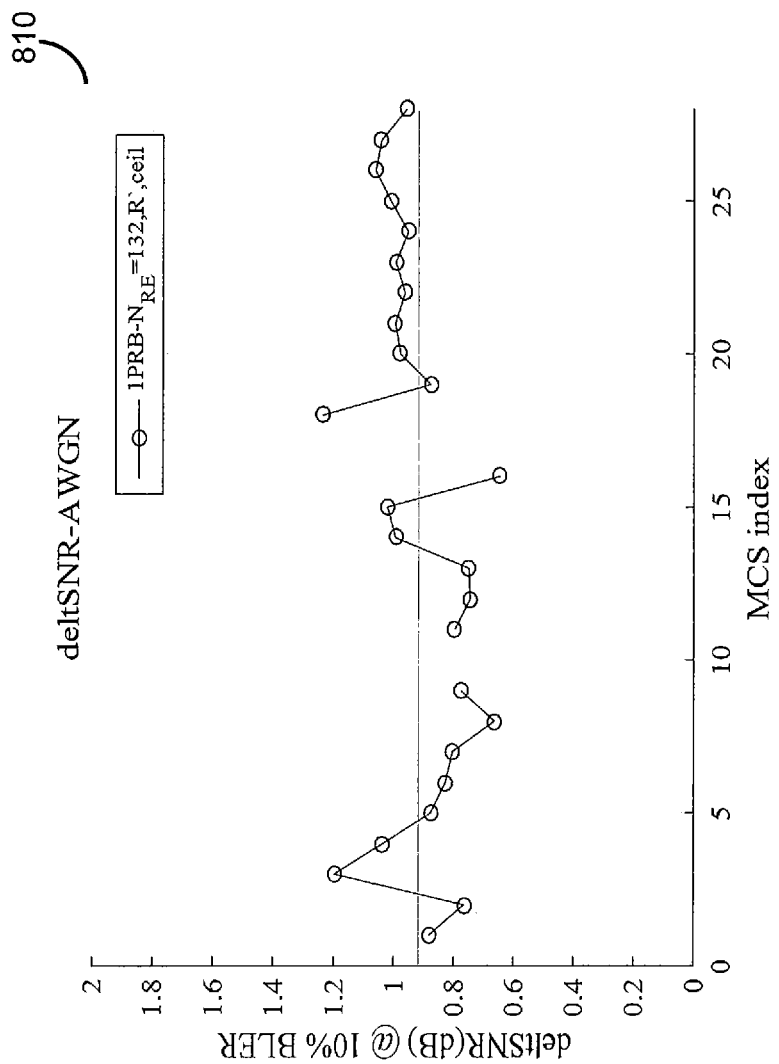
FIG. 8A illustrates yet another exemplary simulation result of link stability changes vs. MCS index, in accordance with an embodiment of the present disclosure.

FIG. 8A illustrates an exemplary simulation result 810 of link stability changes vs. MCS index, in accordance with this embodiment. FIG. 8A utilizes deltaSNR (i.e. ΔSNR) to represent link stability with the TBS calculated and modified using the method in this embodiment to achieve a target BLER=10%. As shown in FIG. 8A, when the MCS index is low (e.g. between 0 and 10), the deltaSNR fluctuates between 0.6 and 1.2, less than the fluctuation in the same MCS range shown in FIG. 1B.

Figure 8B:
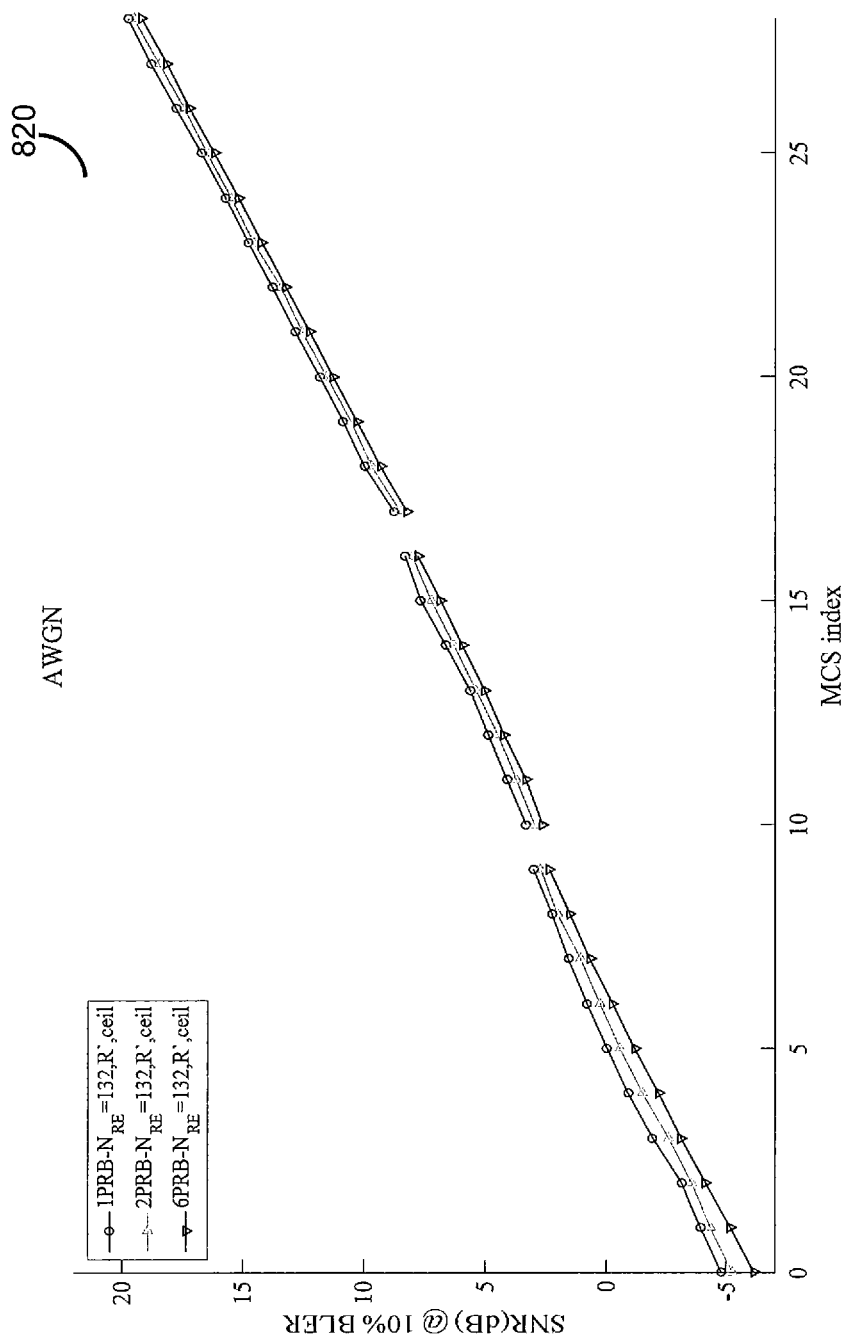
FIG. 8B illustrates yet another exemplary simulation result of SNR performance changes vs. MCS index, in accordance with an embodiment of the present disclosure.

FIG. 8B illustrates an exemplary simulation result 820 of SNR performance change vs. MCS index, in accordance with this embodiment. As shown in FIG. 8B, when the MCS index is low (e.g. between 0 and 10), the SNR curve is not so smooth as the SNR curve when the MCS index is high (e.g. between 20 and 28). As shown in FIG. 8B, given an MCS index range (e.g. between 0 and 10), the SNR curve corresponding to a lower PRB, e.g. when PRB=1, is not so smooth as the SNR curve corresponding to a higher PRB, e.g. when PRB=6, where a smoother SNR curve indicates a more stable link.

Table 8C below shows the TBS values calculated based on a modified code rate R or modified spectral efficiency SE as in the above mentioned method in the third embodiment, with allocated $N_{RE}^{PRB}$=132.

TABLE 8C

| MCS Index | $Q_m$ | PRB 1 | 2 | 3 | 4 | 5 | 6 |
|---|---|---|---|---|---|---|---|
| 0 | 2 | 16 | 48 | 72 | 104 | 128 | 160 |
| 1 | 2 | 24 | 64 | 96 | 136 | 168 | 208 |
| 2 | 2 | 32 | 80 | 128 | 176 | 224 | 272 |
| 3 | 2 | 48 | 104 | 168 | 224 | 280 | 344 |
| 4 | 2 | 64 | 136 | 208 | 280 | 352 | 424 |
| 5 | 2 | 80 | 168 | 256 | 344 | 432 | 520 |
| 6 | 2 | 96 | 200 | 304 | 408 | 512 | 616 |
| 7 | 2 | 112 | 232 | 360 | 480 | 600 | 728 |
| 8 | 2 | 128 | 272 | 408 | 552 | 696 | 832 |
| 9 | 2 | 144 | 304 | 464 | 624 | 784 | 944 |
| 10 | 4 | 144 | 304 | 464 | 624 | 784 | 944 |
| 11 | 4 | 168 | 344 | 520 | 696 | 872 | 1048 |
| 12 | 4 | 192 | 392 | 600 | 800 | 1008 | 1208 |
| 13 | 4 | 216 | 448 | 680 | 904 | 1136 | 1368 |
| 14 | 4 | 248 | 504 | 768 | 1024 | 1288 | 1544 |
| 15 | 4 | 280 | 568 | 856 | 1144 | 1432 | 1720 |
| 16 | 4 | 304 | 624 | 944 | 1264 | 1584 | 1904 |
| 17 | 6 | 304 | 624 | 944 | 1264 | 1584 | 1904 |
| 18 | 6 | 352 | 712 | 1072 | 1432 | 1792 | 2152 |
| 19 | 6 | 384 | 784 | 1184 | 1584 | 1984 | 2384 |
| 20 | 6 | 424 | 864 | 1304 | 1744 | 2184 | 2616 |
| 21 | 6 | 464 | 944 | 1416 | 1896 | 2376 | 2848 |
| 22 | 6 | 504 | 1016 | 1536 | 2048 | 2560 | 3080 |
| 23 | 6 | 544 | 1104 | 1656 | 2216 | 2768 | 3328 |
| 24 | 6 | 584 | 1184 | 1776 | 2376 | 2976 | 3568 |
| 25 | 6 | 624 | 1264 | 1896 | 2536 | 3168 | 3808 |
| 26 | 6 | 664 | 1336 | 2016 | 2688 | 3368 | 4032 |
| 27 | 6 | 696 | 1400 | 2104 | 2808 | 3512 | 4208 |
| 28 | 6 | 720 | 1456 | 2184 | 2920 | 3656 | 4376 |

Table 8D below shows the simulated values of ΔSNR of adjacent MCSs, with the TBS values calculated based on a modified code rate R or modified spectral efficiency SE as in the above mentioned method in the third embodiment, with allocated $N_{RE}^{PRB}=132$, and a target BLER=10%.

TABLE 8D

| ΔSNR $I_{MCS}$ | PRB 1 | 2 | 3 | 4 | 5 | 6 |
|---|---|---|---|---|---|---|
| 0 | NaN | NaN | NaN | NaN | NaN | NaN |
| 1 | 0.882 | 0.9434 | 0.9213 | 0.996 | 1.0212 | 0.9661 |
| 2 | 0.7658 | 0.7567 | 1.0603 | 1.0174 | 1.1137 | 1.0485 |
| 3 | 1.1974 | 0.9617 | 1.0792 | 0.96 | 0.9327 | 1.0026 |
| 4 | 1.0352 | 1.0764 | 0.9073 | 0.9875 | 1.0266 | 0.9327 |
| 5 | 0.8758 | 0.9483 | 0.9703 | 0.9642 | 1.0073 | 1.0038 |
| 6 | 0.8268 | 0.835 | 0.9042 | 0.8773 | 0.8957 | 0.9178 |
| 7 | 0.8041 | 0.8154 | 0.9184 | 0.914 | 0.9221 | 0.9506 |
| 8 | 0.6638 | 0.9624 | 0.7668 | 0.8405 | 0.8798 | 0.8394 |
| 9 | 0.7761 | 0.694 | 0.7997 | 0.8255 | 0.8129 | 0.847 |
| 10 | NaN | NaN | NaN | NaN | NaN | NaN |
| 11 | 0.7961 | 0.7589 | 0.7405 | 0.6579 | 0.6614 | 0.6727 |
| 12 | 0.7447 | 0.7418 | 0.8569 | 0.8696 | 0.8991 | 0.9025 |
| 13 | 0.7499 | 0.894 | 0.8251 | 0.7926 | 0.7785 | 0.7902 |
| 14 | 0.9938 | 0.9008 | 0.8692 | 0.8843 | 0.934 | 0.908 |
| 15 | 1.0215 | 0.9328 | 0.9152 | 0.9306 | 0.8767 | 0.8832 |
| 16 | 0.6453 | 0.784 | 0.853 | 0.904 | 0.9093 | 0.9421 |
| 17 | NaN | NaN | NaN | NaN | NaN | NaN |
| 18 | 1.2379 | 1.1929 | 1.1195 | 1.1073 | 1.1307 | 1.0974 |
| 19 | 0.8761 | 0.8589 | 0.9683 | 0.9294 | 0.9598 | 0.9798 |
| 20 | 0.9768 | 1.0166 | 1.0144 | 1.0278 | 1.0026 | 0.9999 |
| 21 | 0.9947 | 0.992 | 0.9195 | 0.9368 | 0.9457 | 0.9483 |
| 22 | 0.962 | 0.8876 | 1.0037 | 0.9546 | 0.9617 | 0.9879 |
| 23 | 0.9928 | 1.1357 | 1.0201 | 1.0584 | 0.9959 | 0.9943 |
| 24 | 0.9511 | 0.9426 | 0.9596 | 0.9489 | 1.0049 | 0.9808 |
| 25 | 1.0099 | 1.0097 | 0.9852 | 1.0005 | 0.9711 | 1.0125 |
| 26 | 1.061 | 0.9384 | 1.0496 | 1.0067 | 1.0731 | 1.026 |
| 27 | 1.0414 | 1.0513 | 0.9398 | 0.9866 | 0.9268 | 0.9365 |
| 28 | 0.9567 | 1.0495 | 1.031 | 1.0579 | 1.0838 | 1.0464 |

In a fourth embodiment, after the TBS is calculated by using a formula, e.g. an existing formula or a formula according to any one of the above embodiments, if any one of the parameters in the formula changes, the calculated TBS will change. For example, the parameter allocated during the initial pass is: $Q_m=2$, R=308/1024, the number of PRB is 2, the number of REs per PRB is 132, and the TBS is 120. Then the parameters allocated for retransmission are: $Q_m=2$, R=379/1024, the number of PRB is 2, the number of REs per PRB is 132, and the TBS is 176. Because the two calculated TBSs are different, the transmission cannot be continued. In response to this problem, in consideration that the transport block size is the same during initial transmission and retransmission, the TBS is quantized in this embodiment. The quantization step size increases when TBS increase, which can both ensure that the TBS granularity for transmission is good, and ensure that the TBS is the same in initial transmission and retransmission.

The function of the quantization step is as follows:

step=$2^n$, 3≤n≤10 and n is integer.

Taking the value interval of TBS (including CRC check bits) less than 8448 as an example, the set of TBSs that have been verified to be useable is [40:8:512, 528:16:1024, 1056:32:2048, 2048+64:64:6144, 6144+128:128:8448]. After searching the calculated TBS, the new value interval is obtained as [32:8:512, 528:16:992, 1024:32:2048, 2176:64:6144, 6272:128:8192]. Here, 40:8:512, for example, represents a set of values between 40 and 512, with an interval of 8. Simulation results show that when the number of REs is 132, after calculating the intermediate TBS, it is also applicable to take the closest larger TBS from this interval as the actual transmitted TBS.

According to the calculated TBS, it can be known that to ensure the consistency of the TBS in initial transmission and retransmission, the value of the TBS may also be constrained by the number of PRBs and the order of MCS. That is, the quantization step may also be a function of: the number of PRBs, and/or the MCS order, and/or Spectral efficiency (SE) and/or the code rate. For example, when the number of PRBs is less than 3 and the order of MCS is 2, the TBS may have a fixed quantization step of 8; when the number of PRBs is greater than 100, the order of MCS is 6, and the code rate is greater than 8/9, the quantization step may be 512. In this way, the scheduling range of the PRB or $I_{MCS}$ at the initial transmission and retransmission can be expanded, and the TBSs in the initial transmission and the retransmission can obtain the same value in this range.

Figure 9:
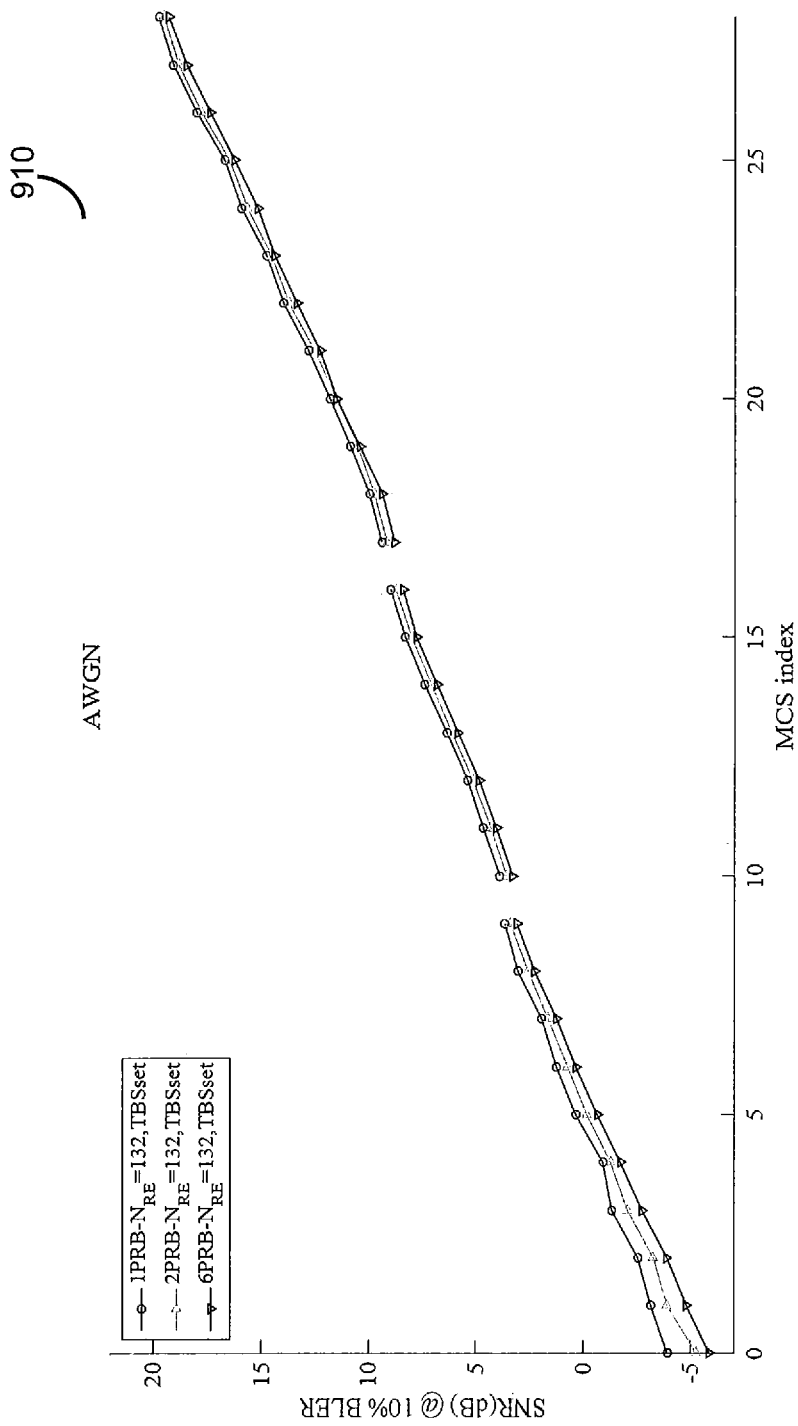
FIG. 9 illustrates a different exemplary simulation result of SNR performance changes vs. MCS index, in accordance with an embodiment of the present disclosure.

FIG. 9 illustrates an exemplary simulation result 910 of SNR performance change vs. MCS index, in accordance with this embodiment. As shown in FIG. 98B, when the MCS index is low (e.g. between 0 and 10), the SNR curve is not so smooth as the SNR curve when the MCS index is high (e.g. between 20 and 28). As shown in FIG. 9B, given an MCS index range (e.g. between 0 and 10), the SNR curve corresponding to a lower PRB, e.g. when PRB=1, is not so smooth as the SNR curve corresponding to a higher PRB, e.g. when PRB=6, where a smoother SNR curve indicates a more stable link.

Table 9 below shows the TBS values calculated based on a useable TBS set as in the above mentioned method in the fourth embodiment, with allocated $N_{RE}^{PRB}=132$.

TABLE 9

| MCS Index | $Q_m$ | PRB 1 | 2 | 3 | 4 | 5 | 6 |
|---|---|---|---|---|---|---|---|
| 0 | 2 | 24 | 48 | 80 | 112 | 144 | 176 |
| 1 | 2 | 32 | 72 | 112 | 152 | 192 | 232 |
| 2 | 2 | 40 | 88 | 136 | 184 | 240 | 288 |

TABLE 9-continued

| MCS Index | $Q_m$ | PRB 1 | 2 | 3 | 4 | 5 | 6 |
|---|---|---|---|---|---|---|---|
| 3 | 2 | 56 | 120 | 184 | 248 | 312 | 376 |
| 4 | 2 | 64 | 144 | 224 | 304 | 384 | 464 |
| 5 | 2 | 88 | 184 | 280 | 376 | 472 | 576 |
| 6 | 2 | 104 | 216 | 336 | 448 | 576 | 688 |
| 7 | 2 | 120 | 256 | 392 | 528 | 672 | 800 |
| 8 | 2 | 144 | 296 | 456 | 608 | 768 | 928 |
| 9 | 2 | 160 | 336 | 512 | 688 | 864 | 1040 |
| 10 | 4 | 160 | 336 | 512 | 688 | 864 | 1040 |
| 11 | 4 | 184 | 376 | 576 | 768 | 960 | 1168 |
| 12 | 4 | 208 | 432 | 656 | 880 | 1104 | 1328 |
| 13 | 4 | 240 | 496 | 752 | 1008 | 1264 | 1520 |
| 14 | 4 | 272 | 560 | 848 | 1136 | 1424 | 1712 |
| 15 | 4 | 304 | 624 | 944 | 1264 | 1584 | 1904 |
| 16 | 4 | 328 | 672 | 1008 | 1360 | 1680 | 2032 |
| 17 | 6 | 328 | 672 | 1008 | 1360 | 1680 | 2032 |
| 18 | 6 | 352 | 720 | 1072 | 1456 | 1808 | 2160 |
| 19 | 6 | 384 | 784 | 1200 | 1584 | 2000 | 2416 |
| 20 | 6 | 424 | 864 | 1328 | 1744 | 2224 | 2672 |
| 21 | 6 | 464 | 944 | 1424 | 1904 | 2416 | 2864 |
| 22 | 6 | 512 | 1040 | 1552 | 2096 | 2608 | 3120 |
| 23 | 6 | 544 | 1104 | 1680 | 2224 | 2800 | 3376 |
| 24 | 6 | 592 | 1200 | 1776 | 2416 | 2992 | 3568 |
| 25 | 6 | 624 | 1264 | 1904 | 2544 | 3184 | 3824 |
| 26 | 6 | 672 | 1360 | 2032 | 2736 | 3376 | 4072 |
| 27 | 6 | 704 | 1424 | 2160 | 2864 | 3568 | 4264 |
| 28 | 6 | 720 | 1456 | 2224 | 2928 | 3696 | 4392 |

In a fifth embodiment, after the TBS is calculated by using a formula, e.g. an existing formula or a formula according to any one of the above embodiments, the UE or BS selects, from a quantized TBS set, a TBS that is closest to the calculated TBS as the final TBS for transmission. The elements {$TBS_i$, i=1, 2, . . . } in the quantized TBS set satisfy at least one of the following conditions.

In accordance with Condition 1, each element $TBS_i$ satisfies: $TBS_i$ mod 8=0, $TBS_i$ $$\mod\left\lceil\frac{TBS_i+TB\_CRC}{8448-24}\right\rceil=0, TBS_i\mod\left\lceil\frac{TBS_i+TB\_CRC}{3840-24}\right\rceil=0;$$

where "X mod Y=0" means X is divisible by X.

In accordance with Condition 2, each element $TBS_i$ satisfies: $TBS_i$ mod 8=0, $TBS_i$ $$\mod\left\lceil\frac{TBS_i+TB\_CRC}{8448-24}\right\rceil=0, TBS_i\mod\left\lceil\frac{TBS_i+TB\_CRC}{3840-24}\right\rceil=0,$$

$$(TBS_i+TB\_CRC)/\left\lceil\frac{TBS_i+TB\_CRC}{8448-24}\right\rceil$$

$$\mod 8=0, (TBS_i+TB\_CRC)/\left\lceil\frac{TBS_i+TB\_CRC}{3840-24}\right\rceil\mod 8=0;$$

where e.g. $\lceil X \rceil$ means rounding up for X.

In accordance with Condition 3, each element $TBS_i$ is less than or equal to 8424, each element $TBS_i$ belongs to the information bit set {24:8:496, 512:16:1008, 1040:32:2032, 2096:64:3824, 3880:64:6120, 6248:128:7656, 8040, 8424}.

In accordance with Condition 4, when $TBS_i$ is less than or equal to a threshold $K_{threshold}$, ($TBS_{LTE}$-$TBS_{NR}$)/$TBS_{NR}$<0.2; and when $TBS_i$ is greater than the threshold $K_{threshold}$, ($TBS_{LTE}$-$TBS_{NR}$)/$TBS_{NR}$<0.05. Here, $K_{threshold}$ is a value from the range {$K_{threshold}$|$K_{min}$<$K_{threshold}$<$K_{max}$}, $K_{min}$ is an integer between 10 and 100, $K_{max}$ is an integer greater than 10000. For example, $K_{threshold}$=1000. $TBS_{LTE}$ is the TBS set defined for a Long Term Evolution (LTE) system; $TBS_{NR}$ is the TBS set defined under this embodiment, i.e. a TBS set to be defined for a NR system based on eMBB.

In accordance with Condition 5, generating a first ordered sequence including integers that are between $K_{min}$ and $K_{min}$, and satisfy Condition 1 or Condition 2; generating a second ordered sequence including integers that are between $K_{min}$ and $K_{min}$, and are predefined for a LTE system; quantizing the first ordered sequence according to the second ordered sequence to generate the third sequence; and the quantized set in this embodiment includes all elements in the third sequence. $K_{min}$ is an integer between 10 and 100, and $K_{max}$ is an integer greater than 10000. For example, $K_{threshold}$=1000.

In one example, the quantization process includes the following steps. First, traverse to get a first sequence TBS Sequence$^x$ satisfying the Condition 1. Then, using the LTE TBS sequence as a second sequence, compare the elements $TBS_i^{LTE}$ in the second sequence with all the elements in the first sequence TBS Sequence$^x$ to find the $TBS_j^x$ in the first sequence that is equal to or rounding to or rounding up to or rounding down to a value $TBS_i^{LTE}$, and replace the original element $TBS_i^{LTE}$ with the $TBS_j^x$ to obtain the third TBS sequence. The quantized set of TBSs shall include at least all the elements in the third TBS Sequence.

For example, a sequence satisfying Condition 1 and including integers from 16 to 512 is taken as the first sequence, and all the elements in the first sequence are as follows: {16 24 32 40 48 56 64 72 80 88 96 104 112 120 128 136 144 152 160 168 176 184 192 200 208 216 224 232 240 248 256 264 272 280 288 296 304 312 320 328 336 344 352 360 368 376 384 392 400 408 416 424 432 440 448 456 464 472 480 488 496 504 512}. All LTE TBSs from 16 to 512 form the second sequence in descending order, where the elements of the second sequence are as follows: {16 24 32 40 56 72 88 104 120 136 144 152 176 208 224 256 280 288 296 328 336 344 376 392 408 424 440 456 472 488 504}. The first sequence is quantized according to the second sequence, which is divided into three quantization methods. Each quantization method obtains a third sequence. During the process of obtaining the third sequence, the quantization method should be consistent. For example, if the second element 24 in the second sequence is compared with each element in the first sequence, and according to the closest element rule, 24 in the first sequence is quantized to be the second element in the third sequence; if the second element 24 in the second sequence is compared with each element in the first sequence, and according to the closest but larger element rule, a larger element value is quantized to obtain 32 in the first sequence as the second element in the third sequence; if the second element 24 in the second sequence is compared with each element in the first sequence, and according to the closest but smaller element rule, a smaller element value is quantized to obtain 16 in the first sequence as the second element in the third sequence; and so on and so forth until the elements in the second sequence are quantified, then three third sequences in descending order are obtained.

According to the first quantization method, the element in the first sequence closest to the second sequence is found, and the third sequence obtained is as follows: {16 24 32 40 56 72 88 104 120 136 144 152 176 208 224 256 280 288 296 328 336 344 376 392 408 424 440 456 472 488 504}. According to the second quantization method, the element in the first sequence that is closest and larger than the second sequence is found, and the third sequence obtained is as follows: {24 32 40 48 56 64 80 96 112 128 144 152 160 184 232 264 288 296 304 336 344 352 384 400 416 432 448 464 480 496 512}. According to the third quantization method, the element in the first sequence that is closest and smaller than the element in the second sequence is found, and the third sequence obtained is as follows: {16 24 32 40 64 80 96 112 128 136 144 168 200 216 248 272 280 288 320 328 336 368 384 400 416 432 448 464 480 496}.

The set of quantized TBSs includes at least all the elements in the third sequence. For example, if the third sequence is a set of quantization TBSs, the resource or transmission parameters are: the modulation order $Q_m=2$, the code rate R=0.5132, the layer number is 1, the number of PRBs is 1, and the number of REs per PRB is 128, rounding up to calculate an intermediate TBS of 132, the nearest neighbor relative to the intermediate TBS is 136 (or a larger value of 136, or a smaller value of 120) is selected as a quantized TBS according to the third sequence to be taken as the actual transmitted TBS.

Figure 10A:
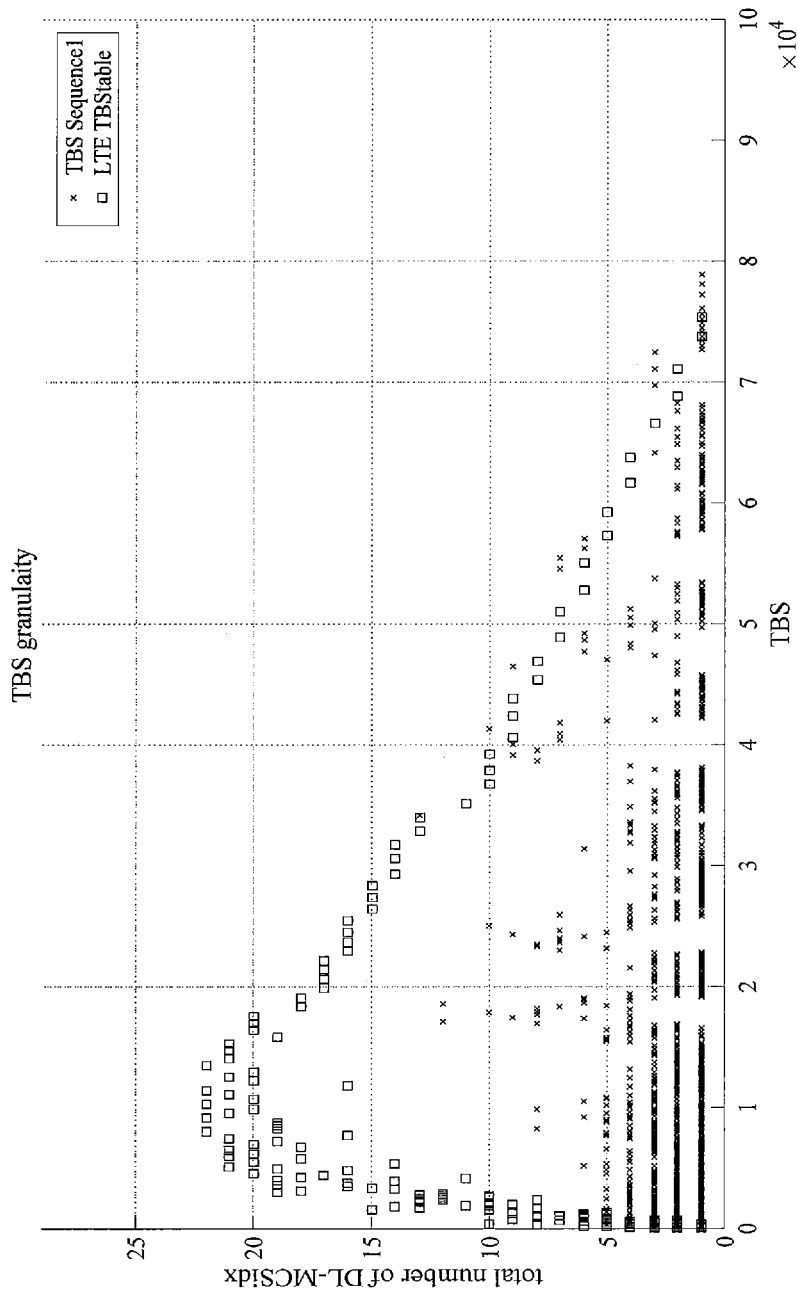
FIG. 10A illustrates an exemplary distribution of unquantized TBS, in accordance with an embodiment of the present disclosure.
Figure 10B:
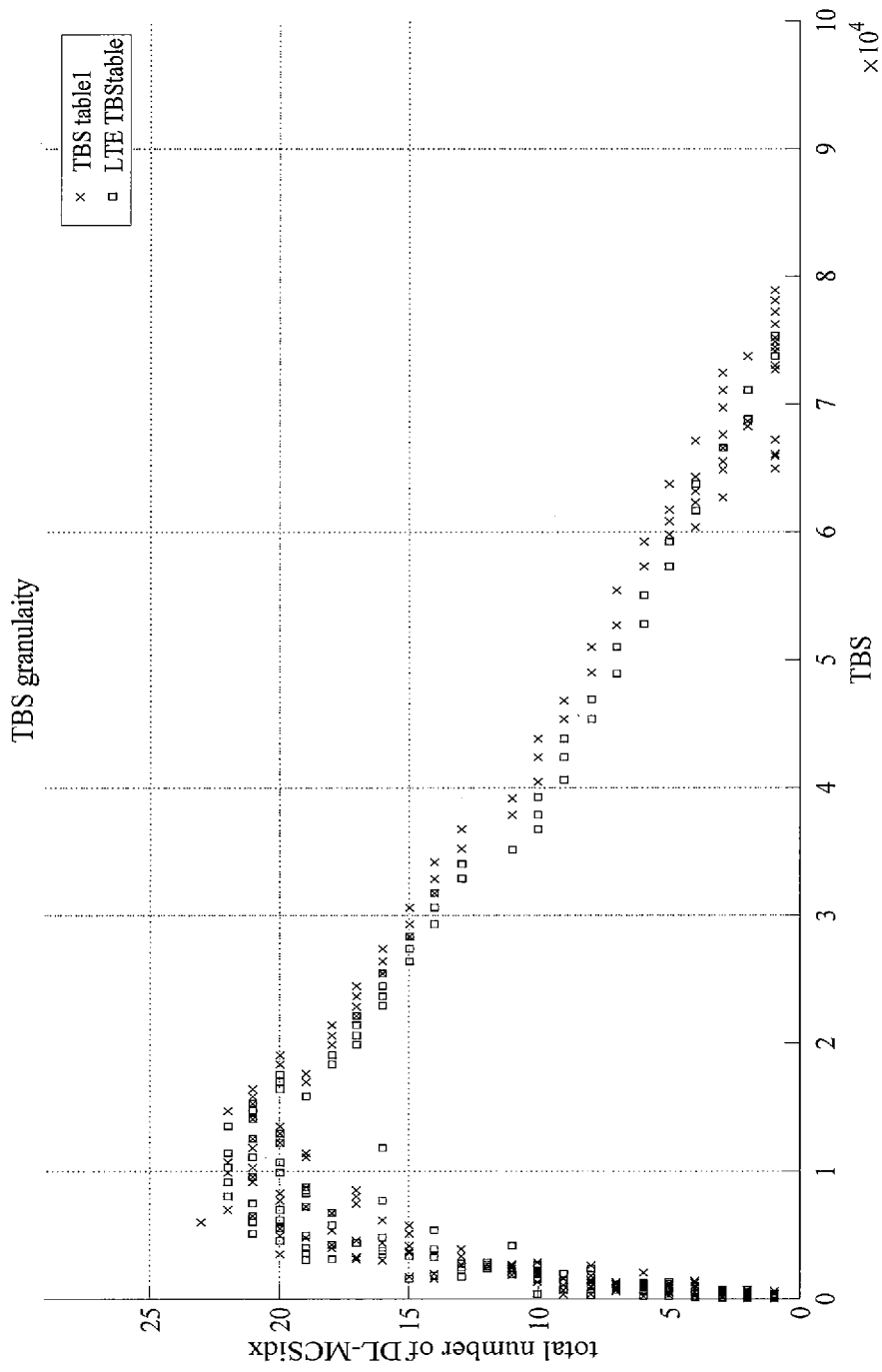
FIG. 10B illustrates an exemplary distribution of quantized TBS, in accordance with an embodiment of the present disclosure.

In one example, suppose the third TBS sequence obtained from the first sequence satisfy the Condition 1. When an unquantized first sequence is taken as a quantized TBS table and referred to as TBS Sequence1, the distribution of the quantized TBS in the PDSCH 64 QAM-MCS table and a comparison with the LTE TBS table is shown in FIG. 10A. When the third TBS Sequence is taken as a quantized TBS table1, the distribution of the quantized TBS in the PDSCH 64 QAM-MCS table and a comparison with the LTE TBS table is shown in FIG. 10B.

Figure 11A:
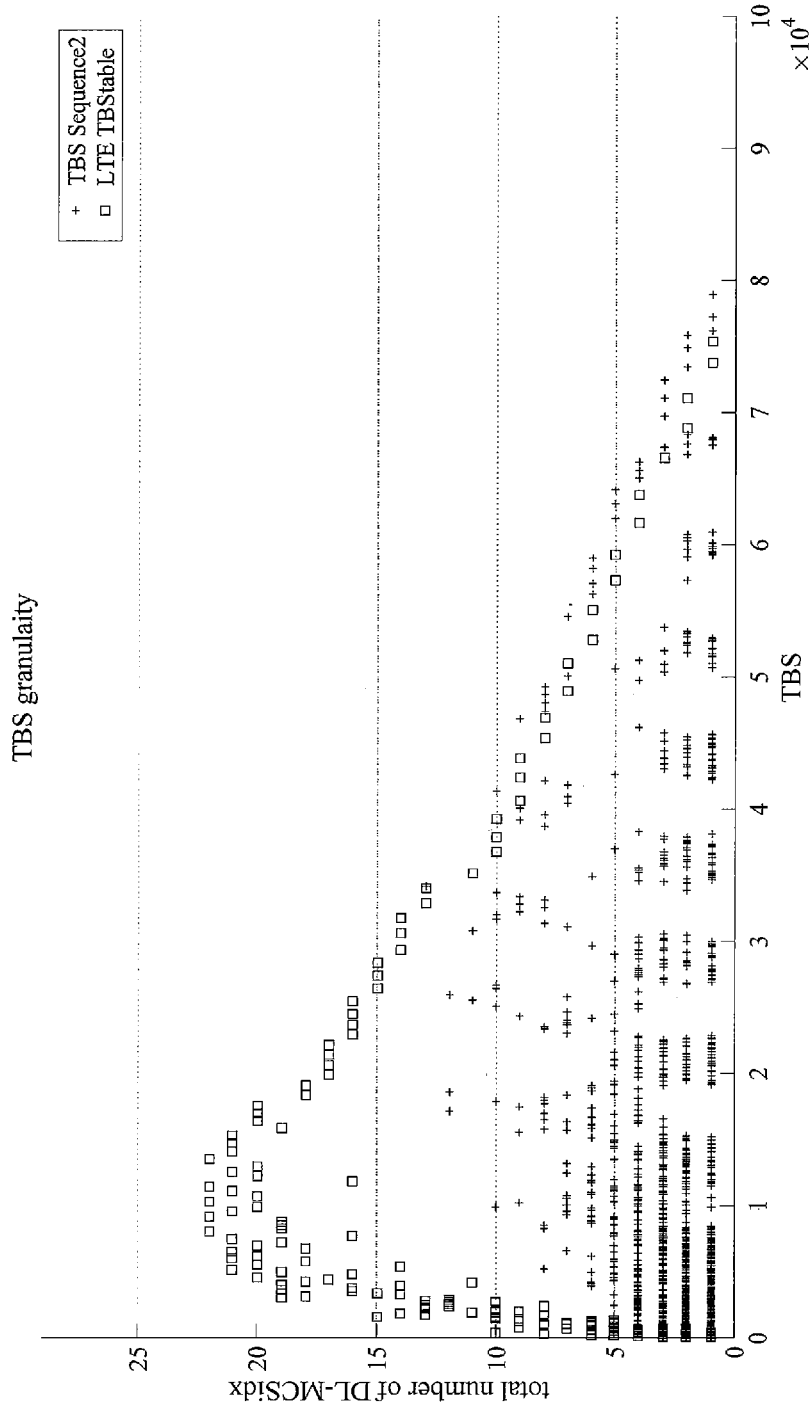
FIG. 11A illustrates another exemplary distribution of unquantized TBS, in accordance with an embodiment of the present disclosure.
Figure 11B:
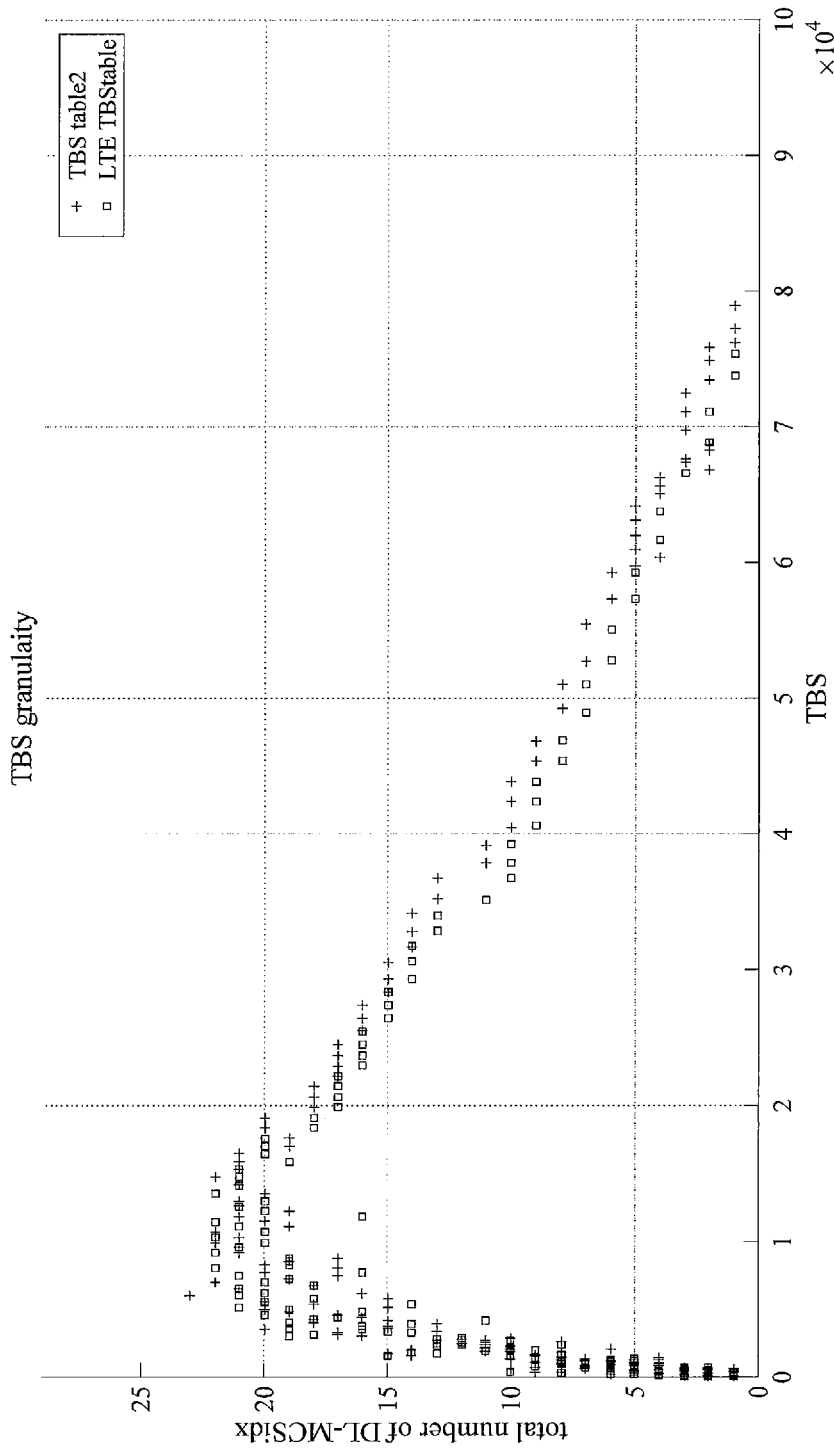
FIG. 11B illustrates another exemplary distribution of quantized TBS, in accordance with an embodiment of the present disclosure.

In another example, suppose the third TBS sequence obtained from the first sequence satisfy the Condition 2. When an unquantized first sequence is taken as a quantized TBS table and referred to as TBS Sequence2, the distribution of the quantized TBS in the PDSCH 64 QAM-MCS table and a comparison with the LTE TBS table is shown in FIG. 11A. When the third TBS Sequence is taken as a quantized TBS table2, the distribution of the quantized TBS in the PDSCH 64 QAM-MCS table and a comparison with the LTE TBS table is shown in FIG. 11B.

Figure 12A:
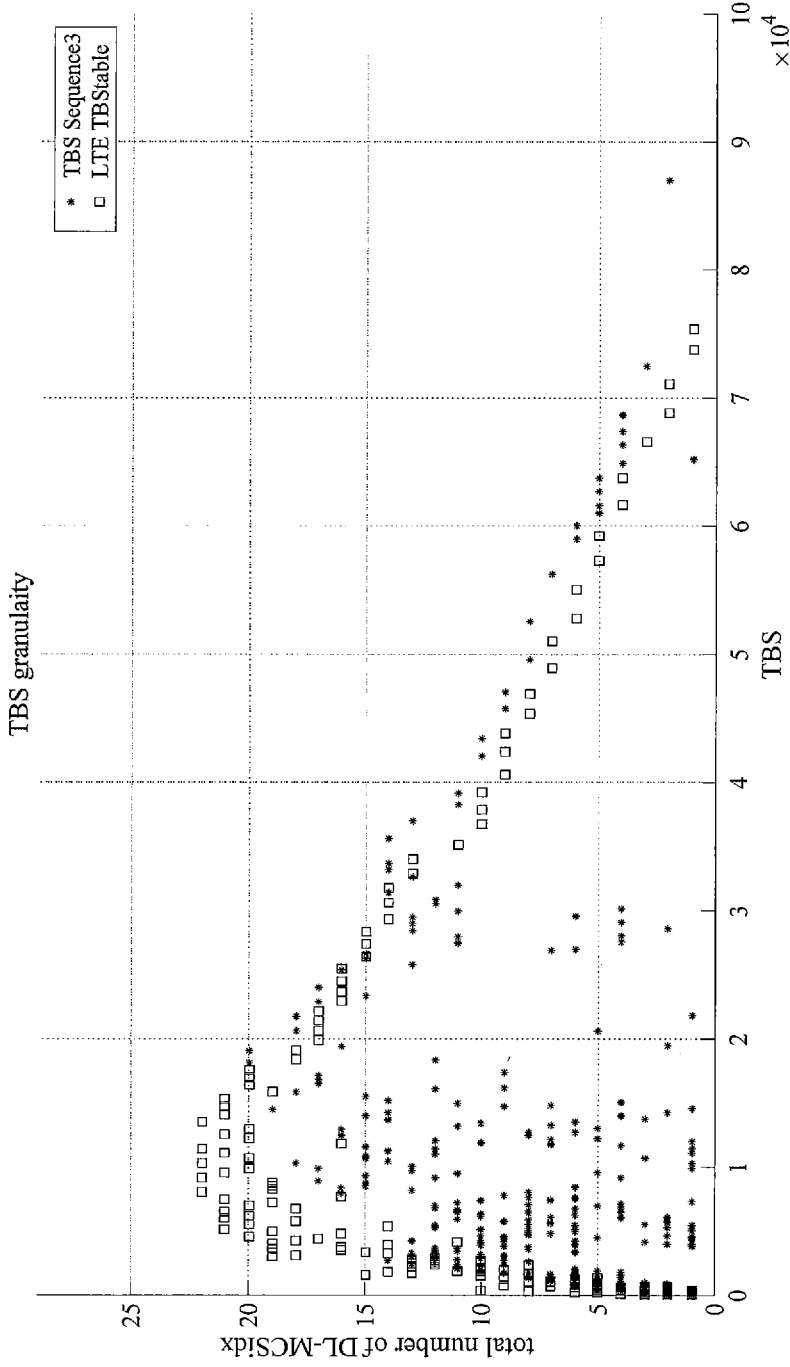
FIG. 12A illustrates yet another exemplary distribution of unquantized IBS, in accordance with an embodiment of the present disclosure.
Figure 12B:
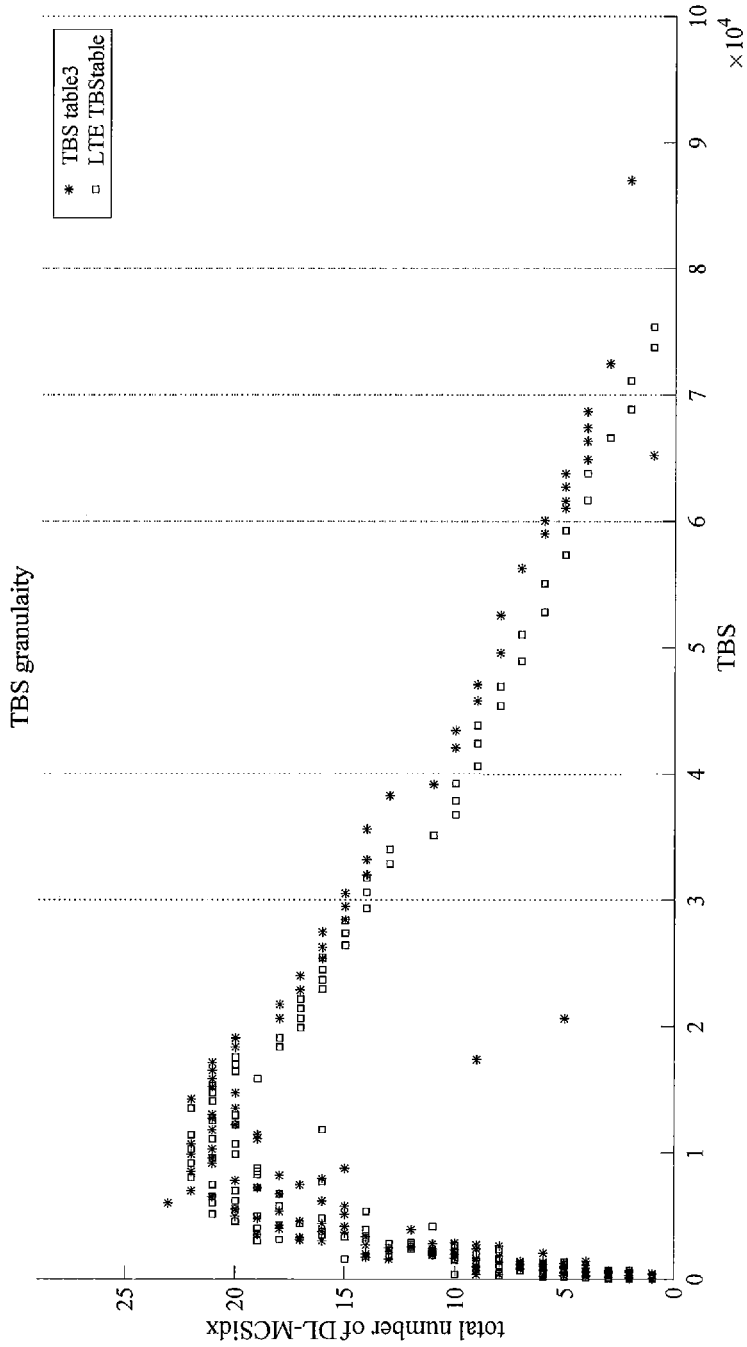
FIG. 12B illustrates yet another exemplary distribution of quantized TBS, in accordance with an embodiment of the present disclosure.

In yet another example, suppose the third IBS sequence obtained from the first sequence satisfy the Condition 3. When an unquantized first sequence is taken as a quantized TBS table and referred to as TBS Sequence3, the distribution of the quantized TBS in the PDSCH 64 QAM-MCS table and a comparison with the LTE TBS table is shown in FIG. 12A. When the third TBS Sequence is taken as a quantized TBS table3, the distribution of the quantized TBS in the PDSCH 64 QAM-MCS table and a comparison with the LTE TBS table is shown in FIG. 12B.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a wireless communication device, the method comprising:
   receiving control information from a wireless communication node, wherein the control information includes a plurality of transmission parameters related to transport blocks to be transmitted between the wireless communication device and the wireless communication node;
   calculating an intermediate transport block size (TBS) for the transport blocks based on the plurality of transmission parameters;
   modifying the intermediate TBS to generate a modified TBS in response to an event that the intermediate TBS is smaller than a threshold; and
   determining a final TBS for the transport blocks based on a TBS that is closest to the modified TBS, among TBSs that are in a quantized set and not smaller than the modified TBS.

2. The method of claim 1, wherein the plurality of transmission parameters comprises:
   a modulation order configured for transmission of the transport blocks;
   a code rate configured for transmission of the transport blocks; and
   a quantity of physical resource blocks configured for transmission of the transport blocks.

3. The method of claim 2, wherein modifying the intermediate TBS comprises:
   determining a correction factor based on: the quantity of physical resource blocks, the modulation order and the code rate; and
   modifying the intermediate TBS by the correction factor to generate the modified TBS.

4. The method of claim 2, wherein calculating the intermediate TBS comprises:
   calculating a multiplication product of: the modulation order, the code rate, the quantity of physical resource blocks, and a quantity of layers configured for transmission of the transport blocks; and
   using the multiplication product as the intermediate TBS.

5. The method of claim 1, wherein modifying the intermediate TBS comprises:
   dividing the intermediate TBS by a quantization step that is equal to a power of two to generate a quotient;
   rounding down the quotient to generate a first integer;
   multiplying the first integer by the quantization step to generate a second integer; and
   generating the modified TBS based on the second integer.

6. A method performed by a wireless communication node, the method comprising:
   generating a plurality of transmission parameters related to transport blocks;
   transmitting control information that comprises the plurality of transmission parameters;
   calculating an intermediate transport block size (TBS) for the transport blocks based on the plurality of transmission parameters;
   modifying the intermediate TBS to generate a modified TBS in response to an event that the intermediate TBS is smaller than a threshold;
   determining a final TBS for the transport blocks based on a TBS that is closest to the modified TBS, among TBSs that are in a quantized set and not smaller than the modified TBS; and
   communicating with a wireless communication device using the transport blocks based on the final TBS.

7. The method of claim 6, wherein the plurality of transmission parameters comprises:
   a modulation order configured for transmission of the transport blocks;
   a code rate configured for transmission of the transport blocks; and
   a quantity of physical resource blocks configured for transmission of the transport blocks.

8. The method of claim 7, wherein modifying the intermediate TBS comprises:
   determining a correction factor based on: the quantity of physical resource blocks, the modulation order and the code rate; and
   modifying the intermediate TBS by the correction factor to generate the modified TBS.

9. The method of claim 7, wherein calculating the intermediate TBS comprises:

calculating a multiplication product of: the modulation order, the code rate, the quantity of physical resource blocks, and a quantity of layers configured for transmission of the transport blocks; and using the multiplication product as the intermediate TBS.

10. The method of claim 6, wherein modifying the intermediate TBS comprises:

dividing the intermediate TBS by a quantization step that is equal to a power of two to generate a quotient;

rounding down the quotient to generate a first integer;

multiplying the first integer by the quantization step to generate a second integer; and generating the modified TBS based on the second integer.

11. A first communication apparatus comprising a processor and a memory, wherein the memory stores instructions that, when executed, causes the processor to implement a method recited in any of claims 1 to 5.

12. A first communication apparatus comprising a processor and a memory, wherein the memory stores instructions that, when executed, causes the processor to implement a method recited in any of claims 6 to 10.

13. A non-transitory computer-readable medium having computer-executable instructions stored thereon, the computer-executable instructions, when executed by a processor, causing the processor to implement a method recited in any of claims 1 to 10.

* * * * *

UNITED STATES PATENT AND TRADEMARK OFFICE
CERTIFICATE OF CORRECTION

PATENT NO. : 10,880,888 B2
APPLICATION NO. : 16/539242
DATED : December 29, 2020
INVENTOR(S) : Qiujin Guo et al.

Page 1 of 1

It is certified that error appears in the above-identified patent and that said Letters Patent is hereby corrected as shown below:

In the Specification

Column 18, Lines 19-23:

"
$$\beta = \begin{cases} \frac{2^{n1}-1}{2^{n1}}, n1\text{为正整数} & N_{PRB}^{XL} < x, (or) Q_m \in S_{lower\_MCS} \\ \frac{2^{n2}-1}{2^{n2}}, n2\text{为正整数} & Q_m \in S_{overlappingSE\_higherMCS} \\ 1 & else. \end{cases}$$
"

Should read:

$$\beta = \begin{cases} \frac{2^{n1}-1}{2^{n1}}, n1 \text{ is a positive integer} & N_{PRB}^{XL} < x, (or) Q_m \in S_{lower\_MCS} \\ \frac{2^{n2}-1}{2^{n2}}, n2 \text{ is a positive integer} & Q_m \in S_{overlappingSE\_higherMCS} \\ 1 & else. \end{cases}$$

Signed and Sealed this
Twenty-first Day of February, 2023

*Katherine Kelly Vidal*

Katherine Kelly Vidal
*Director of the United States Patent and Trademark Office*